US012198629B2

(12) United States Patent
Zheng

(10) Patent No.: US 12,198,629 B2
(45) **Date of Patent: *Jan. 14, 2025**

(54) PIXEL CIRCUIT FOR THRESHOLD COMPENSATION, DRIVING METHOD THEREOF AND DISPLAY DEVICE FOR PROVIDING SIGNALS

(71) Applicant: BOE TECHNOLOGY GROUP CO., LTD., Beijing (CN)

(72) Inventor: Can Zheng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/325,032

(22) Filed: May 29, 2023

(65) Prior Publication Data

US 2023/0306911 A1 Sep. 28, 2023

Related U.S. Application Data

(63) Continuation of application No. 16/768,306, filed as application No. PCT/CN2019/089837 on Jun. 3, 2019, now Pat. No. 11,727,868.

(51) Int. Cl.

*G09G 3/3233* (2016.01)
*G09G 3/3266* (2016.01)
*G09G 3/3291* (2016.01)

(52) U.S. Cl.

CPC ......... *G09G 3/3233* (2013.01); *G09G 3/3266* (2013.01); *G09G 3/3291* (2013.01); *G09G 2310/061* (2013.01); *G09G 2310/08* (2013.01)

(58) Field of Classification Search

CPC ... G09G 2310/0286; G09G 2300/0819; G09G 3/3266

See application file for complete search history.

(56) References Cited

U.S. PATENT DOCUMENTS 9,627,089 B2 * 4/2017 Qi ........................ G11C 19/184
9,747,839 B2 * 8/2017 Wang .................. G09G 3/3291

(Continued)

FOREIGN PATENT DOCUMENTS

CN 103474022 A 12/2013
CN 103927979 A 7/2014

(Continued)

OTHER PUBLICATIONS

Office Action issued for Chinese Patent Application No. 201980000778.3, mailed on Dec. 15, 2021, 15 pages.

(Continued)

*Primary Examiner* — Sepehr Azari
(74) *Attorney, Agent, or Firm* — Davé Law Group, LLC; Raj S. Davé

(57) ABSTRACT

Disclosed are a pixel circuit, a driving method of the pixel circuit and a display device, the pixel circuit including a reset unit, a voltage writing unit and a light-emitting control unit, the reset unit is connected to a reset control signal terminal, and resets the pixel circuit under the control of the reset control signal; the voltage writing unit stores a data signal and a threshold voltage of a driving transistor under the control of the scan control signal; the light-emitting control unit is connected to a light-emitting control signal terminal and includes the driving transistor, and use the data signal and the threshold voltage to generate a current under control of the light-emitting control signal; the light-emitting control unit includes a first type transistor, the reset unit and the voltage writing unit include a second type transistor different from the first type transistor.

20 Claims, 9 Drawing Sheets

(56) References Cited

U.S. PATENT DOCUMENTS

| | | | | |
|---|---|---|---|---|
| 9,871,082 | B2 | 1/2018 | Jeon | |
| 10,083,658 | B2 * | 9/2018 | Wang | G09G 3/3233 |
| 10,140,928 | B2 * | 11/2018 | Wang | G09G 3/3283 |
| 10,255,859 | B2 * | 4/2019 | Wang | G09G 3/3266 |
| 10,438,538 | B2 * | 10/2019 | Kim | G09G 3/3233 |
| 10,726,786 | B2 | 7/2020 | Yuan | |
| 10,733,940 | B2 * | 8/2020 | Lee | G09G 3/3233 |
| 10,885,839 | B2 | 1/2021 | Wang | |
| 11,145,241 | B2 * | 10/2021 | Chen | G09G 3/3233 |
| 2007/0079191 | A1 * | 4/2007 | Shin | G09G 3/325 714/726 |
| 2008/0218502 | A1 * | 9/2008 | Lee | G11C 19/182 345/87 |
| 2010/0309184 | A1 * | 12/2010 | Yamamoto | H03K 17/161 345/209 |
| 2011/0193856 | A1 * | 8/2011 | Han | G09G 3/3233 345/76 |
| 2012/0327131 | A1 * | 12/2012 | Jang | G09G 3/3266 327/427 |
| 2013/0057532 | A1 * | 3/2013 | Lee | G09G 3/3225 345/76 |
| 2016/0267843 | A1 * | 9/2016 | Wang | G09G 3/3233 |
| 2016/0379558 | A1 * | 12/2016 | Jeon | G11C 19/184 345/213 |
| 2017/0337877 | A1 * | 11/2017 | Kim | G09G 3/3225 |
| 2018/0075923 | A1 * | 3/2018 | Ma | G11C 19/28 |
| 2018/0082623 | A1 * | 3/2018 | Wang | G11C 19/28 |
| 2018/0091151 | A1 * | 3/2018 | Zheng | H03K 19/096 |
| 2018/0174553 | A1 * | 6/2018 | Bong | G09G 3/3266 |
| 2018/0233090 | A1 * | 8/2018 | Zhang | G11C 19/28 |
| 2018/0315374 | A1 * | 11/2018 | Zhang | G09G 3/3208 |
| 2019/0066597 | A1 * | 2/2019 | Lan | G09G 3/3266 |
| 2019/0164478 | A1 * | 5/2019 | Kim | H10K 59/131 |
| 2019/0164491 | A1 * | 5/2019 | Kim | H10K 59/131 |
| 2020/0027403 | A1 * | 1/2020 | Chang | G09G 3/3258 |
| 2020/0234633 | A1 * | 7/2020 | Wang | G09G 3/325 |
| 2021/0233968 | A1 | 7/2021 | Yang et al. | |

FOREIGN PATENT DOCUMENTS

| | | | |
|---|---|---|---|
| CN | 105206221 | A | 12/2015 |
| CN | 107808630 | A | 3/2018 |
| CN | 109036279 | A | 12/2018 |
| CN | 109427290 | A | 3/2019 |

OTHER PUBLICATIONS

Non-Final Office action issued for U.S. Appl. No. 16/768,306, mailed on Jan. 18, 2022, 21 pages.

Response to Non-Final Office action filed for U.S. Appl. No. 16/768,306, on Mar. 16, 2022, 17 pages.

Final Office action issued for U.S. Appl. No. 16/768,306, mailed on Apr. 22, 2022, 17 pages.

Response to Final Office action filed for U.S. Appl. No. 16/768,306, on May 26, 2022, 15 pages.

Amendment while filing Request for Continued for U.S. Appl. No. 16/768,306, on Jul. 12, 2022, 18 pages.

Non-Final Office action issued for U.S. Appl. No. 16/768,306, mailed on Aug. 4, 2022, 20 pages.

Response to Non-Final Office action filed on U.S. Appl. No. 16/768,306, on Nov. 1, 2022, 20 pages.

Final Office action issued for U.S. Appl. No. 16/768,306, mailed on Dec. 28, 2022, 25 pages.

Response to Final Office action filed on U.S. Appl. No. 16/768,306, on Feb. 28, 2023, 12 pages.

Notice of Allowance issued for U.S. Appl. No. 16/768,306, mailed on Mar. 20, 2023, 6 pages.

* cited by examiner

200

PIXEL CIRCUIT FOR THRESHOLD COMPENSATION, DRIVING METHOD THEREOF AND DISPLAY DEVICE FOR PROVIDING SIGNALS

CROSS REFERENCE TO RELATED APPLICATIONS

This application is a continuation of U.S. patent application Ser. No. 16/768,306, filed on May 29, 2020, which is a U.S. National Phase Entry of International Application No. PCT/CN2019/089837 filed on Jun. 3, 2019. All the aforementioned patent applications are hereby incorporated by reference in their entireties.

TECHNICAL FIELD

The present disclosure relates to the field of display technology, and more particularly, to a pixel circuit, a driving method of the pixel circuit, a display device and a driving method of the display device.

BACKGROUND

With the rapid development of display technology, higher requirements are demanded for resolution and shape dimension of the display device. The pixel circuit of current organic light-emitting diode (OLED) display device usually consists of multiple low-temperature polysilicon thin film transistors (LTPS TFTs), and it receives the reset control signal Reset, the data control signal Gate_N, Gate_P, the light-emitting control signal EM and other types of control signals, so as to realize the control over an operating state of the pixel circuit, thereby realizing various functions.

However, when using the display device composed of the above pixel circuit, due to complexity of the pixel circuit structure, as the number of pixels increases, the volume of the display device will increase, which is not conducive to narrow-frame display; and because the pixel circuit is controlled by multiple control signals and has relatively complicated control timing, multiple groups (generally at least three groups or more) of Gate Driver on Array (GOA) are required to generate related control signals, the internal volume of the display device is further increased; in addition, due to the large power consumption of the low-temperature polysilicon thin film transistor, the power consumption of the display device is large.

Therefore, a pixel circuit that has a simple structure, a small number of received control signals, a low power consumption, and a small volume is desired under the premise of realizing the functions of a display device.

SUMMARY

In view of the above problems, the present disclosure provides a pixel circuit, a driving method of the pixel circuit, a display device, and a driving method of the display device. The pixel circuit provided by the present disclosure can effectively reduce the number of control signals, simplify the structure of the pixel circuit, reduce the volume of the pixel circuit, and save power consumption while achieving the basic functions of the display device.

According to an aspect of the present disclosure, a pixel circuit is disclosure, which receives three control signals, a reset control signal, a scan control signal and a light-emitting control signal, the pixel circuit including a reset unit, a voltage writing unit and a light-emitting control unit, wherein the reset unit is connected to a reset control signal terminal, and is configured to receive the reset control signal from the reset control signal terminal, and reset the pixel circuit under control of the reset control signal; the voltage writing unit is connected to a data line and a scan control signal line, and is configured to receive the scan control signal from the scan control signal line, and store a data signal of the data line and a threshold voltage of a driving transistor under control of the scan control signal; the light-emitting control unit is connected to a light-emitting control signal terminal and includes the driving transistor, and is configured to receive the light-emitting control signal from the light-emitting control signal terminal, and use the data signal and the threshold voltage of the driving transistor as stored in the pixel circuit to generate a current which drives the light-emitting means to emit light under control of the light-emitting control signal; wherein the light-emitting control unit includes a first type transistor, the reset unit and the voltage writing unit include a second type transistor different from the first type transistor.

In some embodiments, the reset unit includes: a first reset transistor, a gate thereof being connected to the reset control signal terminal, a first terminal thereof being connected to a first reference voltage terminal, and a second terminal thereof being connected to a second node; a second reset transistor, a gate thereof being connected to the reset control signal terminal, a first terminal thereof being connected to a first node, and a second terminal thereof being connected to a second reference voltage terminal; a third reset transistor, a gate thereof being connected to the reset control signal terminal, a first terminal thereof being connected to the second reference voltage terminal, and a second terminal thereof being connected to at least one light-emitting means; wherein the reset unit is configured to reset the first node and the second node under control of the reset control signal.

In some embodiments, the first reference voltage terminal is a reference potential terminal or a power supply voltage terminal or a data line.

In some embodiments, the voltage writing unit includes: an input transistor, a gate thereof being connected to the scan control signal line, a first terminal thereof being connected to the second node, and a second terminal thereof being connected to the data line; a first compensation transistor, a gate thereof being connected to the scan control signal line, a first terminal thereof being connected to the first node, and a second terminal thereof being connected to a second terminal of the driving transistor in the light-emitting control unit; a compensation capacitor, a first terminal thereof being connected to the second node, and a second terminal thereof being connected to the first node; wherein the voltage writing unit is configured to write the data signal of the data line to the second node under control of the scan control signal, and store the data signal and the threshold voltage of the driving transistor between the first node and the second node.

In some embodiments, the light-emitting control unit includes: the driving transistor, a gate thereof being connected to the first node, and a first terminal thereof being connected to the power supply voltage terminal; a first light-emitting transistor, a gate thereof being connected to the light-emitting control signal terminal, a first terminal thereof being connected to the reference potential terminal, and a second terminal thereof being connected to the second node; a light-emitting control transistor, a gate thereof being connected to the light-emitting control signal terminal, a first terminal thereof being connected to the second terminal of the driving transistor, and a second terminal thereof being connected to at least one light-emitting means; wherein the light-emitting control unit is configured to use the data signal and the threshold voltage of the driving transistor as stored between the first node and the second node to generate a current that drives the light-emitting means to emit light under control of the light-emitting control signal.

In some embodiments, the first reset transistor, the second reset transistor, the third reset transistor, the input transistor and the first compensation transistor all are N-type oxide thin film transistors, the driving transistor, the first light-emitting transistor and the light-emitting control transistor all are P-type low-temperature polysilicon thin film transistors.

According to an aspect of the present disclosure, a display device is proposed. The display device including a pixel circuit array, a first GOA circuit and a second GOA circuit, the pixel circuit array including a plurality of the pixel circuits as described above, the first GOA circuit and the second GOA circuit provide three control signals to each pixel circuit in the pixel circuit array, a reset control signal, a scan control signal, and a light-emitting control signal, wherein the first GOA circuit is configured to provide the reset control signal and the scan control signal to the pixel circuit; the second GOA circuit is configured to provide the light-emitting control signal to the pixel circuit.

In some embodiments, the reset control signal and the scan control signal have different start time and the same duration; the reset control signal and the light-emitting control signal have the same start time, the light-emitting control signal has a duration longer than that of the reset control signal.

In some embodiments, the first GOA circuit and the second GOA circuit are the same GOA circuit, and the first GOA circuit and the second GOA circuit both receive a first power supply signal, a second power supply signal, and a clock signal.

In some embodiments, each of the first GOA circuit and the second GOA circuit includes a plurality of cascaded GOA units, wherein the first power supply terminals of all the GOA units receive the first power supply signal, second power supply terminals of all the GOA units receive the second power supply signal; a signal output terminal of the GOA unit at each stage is connected to a first input terminal of the GOA unit at an adjacent next stage; a second input terminal of the GOA unit at each stage is connected to a pull-up input node of the GOA unit at an adjacent next stage; a first clock signal at a first clock terminal of the GOA unit at each stage is the same as the second clock signal at a second clock terminal of the GOA unit at an adjacent next stage; the second clock signal at the second clock terminal of the GOA unit at each stage is the same as the first clock signal at the first clock terminal of the GOA unit at an adjacent next stage.

In some embodiments, each of the plurality of GOA units includes an input module, a pull-up control module, a pull-up module, a pull-down control module, a pull-down module, wherein the input module is connected to the second power supply terminal, the second clock terminal and the first input terminal, and is configured to generate and output a first control signal according to a first input signal of the first input terminal and generate and output a second control signal according to the second power supply signal at the second power supply terminal when the second clock signal of the second clock terminal is at an active level; the pull-up control module is connected to the input module, the first power supply terminal and the first clock terminal, has a first control input node and a second control input node, and is configured to write the first control signal and the second control signal as received from the input module into the first control input node and the second control input node respectively, and generate and output a pull-up control signal when the first control input node is at an inactive level and the second control input node and the first clock signal at the first clock terminal both are at an active level; the pull-up module is connected to the pull-up control module, the first power supply terminal and the signal output terminal, and has a pull-up input node, the pull-up module is configured to cause the pull-up input node to be at an active level to write the first power supply signal of the first power supply terminal to the signal output terminal under control of the pull-up control signal; the pull-down control module is connected to the input module and the first clock terminal, and has a pull-down control input node, the pull-down control module is configured to cause the pull-down control input node to be at an active level and output a pull-down control signal under control of the first control signal; the pull-down module is connected to the pull-down control module, the second power supply terminal, the second input terminal and the signal output terminal, and has a pull-down input node, the pull-down module is configured to cause the pull-down input node to be at an active level to write the second power supply signal of the second power supply terminal to the signal output terminal under control of the pull-down control signal.

In some embodiments, the pull-down module includes: a pull-down transistor, a gate thereof being connected to the pull-down input node, a first terminal thereof being connected to the signal output terminal, and a second terminal thereof being connected to the second power supply terminal; a tenth transistor, a gate thereof being connected to the second input terminal, and a first terminal thereof being connected to the signal output terminal; a fourth capacitor, a first terminal thereof being connected to a second terminal of the tenth transistor and a second terminal thereof being connected to the pull-down input node.

According to another aspect of the disclosure, a method for driving the display device as described above is proposed, wherein for each GOA unit: applying an inactive level to the first input terminal, applying an inactive level to the first clock terminal, and applying an active level to the second clock terminal, generating a first control signal at an inactive level and a second control signal at an active level; applying an active level to the first clock terminal, generating a pull-up control signal according to the first control signal and the second control signal, and writing the first power supply signal of the first power supply terminal to the signal output terminal based on the pull-up control signal; applying an active level to the first input terminal, the second input terminal and the second clock terminal, generating a first control signal at the active level, generating a pull-down control signal according to the first control signal, and writing the second power supply signal from the second power supply terminal to the signal output terminal based on the pull-down control signal.

According to another aspect of the disclosure, a method for driving the pixel circuit as described above is proposed. The method including: applying an active level to the reset control signal terminal, resetting the pixel circuit; applying an active level to the scan control signal line, storing the data signal and the threshold voltage of the driving transistor in the pixel circuit; and applying an active level to the light-emitting control signal terminal, and using the data signal and the threshold voltage of the driving transistor as stored in the pixel circuit to drive the light-emitting means to emit light.

BRIEF DESCRIPTION OF THE DRAWINGS

In order to more clearly illustrate the technical solutions of the embodiments of the present disclosure, hereinafter, the drawings necessary for illustration of the embodiments of the present disclosure will be introduced briefly, obviously, the drawings described below are only some embodiments of the present disclosure, it is possible for a person of ordinary skill in the art to obtain other drawings based on these drawings without paying creative efforts. The following drawings are focused on showing the gist of the present disclosure, not schematically scaled by actual dimensions.

DETAILED DESCRIPTION OF THE EMBODIMENTS

Hereinafter, the technical solutions in the embodiments of the present disclosure will be described in a clear and complete way with reference to the accompanying drawings. Obviously, these described embodiments are merely parts of the embodiments of the present disclosure, rather than all of the embodiments thereof. Other embodiments obtained by a person of ordinary skill in the art based on the embodiments of the present disclosure without paying creative effort all fall into the protection scope of the present disclosure.

As used herein, the singular forms "a", "an" and/or "the" may be intended to include the plural forms as well, unless the context clearly indicates otherwise. Generally, the terms "include" and "comprise" are intended to include only the steps and elements that are specified, but these steps and elements do not constitute an exclusive list, and the method or device may also include other steps or elements.

Although the present disclosure makes various references to certain modules in the system in accordance with the embodiments of the present disclosure, any number of different modules can be used and executed on a user terminal and/or a server. The modules are merely illustrative, and different aspects of the systems and methods may use different modules.

Flowcharts are used in the present disclosure to illustrate operations executed by the system in accordance with the embodiments of the present disclosure. It should be understood that the preceding or subsequent steps are not necessarily performed in the precise order. Instead, the respective steps may be processed in the reverse order or simultaneously as needed. Also, other operations may be added to these procedures, or one or more steps may be removed from these procedures.

Figure 1A:
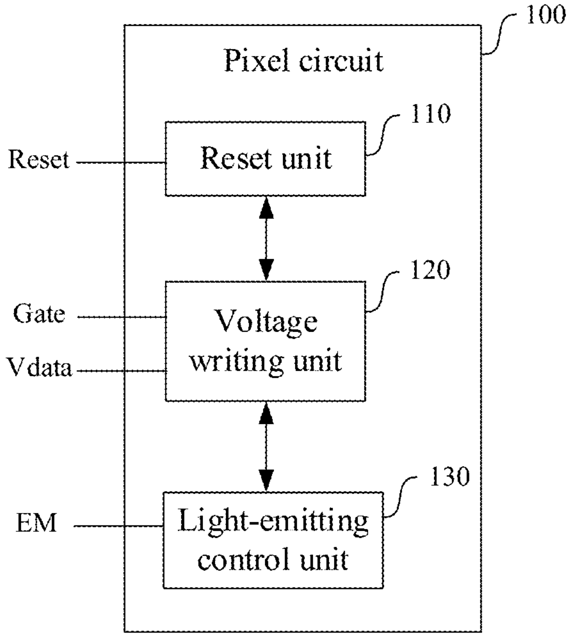
FIG. 1A shows a schematic diagram of a pixel circuit 100 according to an embodiment of the present disclosure.

FIG. 1A shows a schematic diagram of a pixel circuit 100 according to an embodiment of the present disclosure.

Referring to FIG. 1A, the pixel circuit 100 receives three control signals, a reset control signal Reset, a scan control signal Gate and a light-emitting control signal EM, the pixel circuit 100 includes a reset unit 110, a voltage writing unit 120 and a light-emitting control unit 130.

The reset unit 110 is connected to a reset control signal terminal, and is configured to receive the reset control signal Reset from the reset control signal terminal, and reset the pixel circuit under control of the reset control signal Reset.

The voltage writing unit 120 is connected to a data line and a scan control signal line, and is configured to receive the scan control signal Gate from the scan control signal line, and store a data signal Vdata of the data line and a threshold voltage Vth of a driving transistor under control of the scan control signal Gate.

The light-emitting control unit 130 is connected to a light-emitting control signal terminal and includes the driving transistor, the light-emitting control unit is configured to receive the light-emitting control signal EM from the light-emitting control signal terminal, and use the data signal Vdata and the threshold voltage Vth of the driving transistor as stored in the pixel circuit to generate a current that drives the light-emitting means to emit light under control of the light-emitting control signal EM.

The data signal Vdata may be, for example, a high level signal, or it may also be a low level signal, the embodiments of the present disclosure are not limited by the specific level that is set for the data signal.

The light-emitting control unit includes a first type transistor, the reset unit and the voltage writing unit include a second type transistor different from the first type transistor.

The different types of the transistor are intended to characterize the different driving modes of the transistor. For example, the first type transistor is an N-type transistor and the second-type transistor is a P-type transistor; or the first-type transistor is a P-type transistor and the second type transistor is an N-type transistor. The embodiments of the present disclosure are not limited by the specific types of the first type transistor and the second type transistor that are selected.

It should be understood that the first type transistor and the second type transistor described in the present application are only used to distinguish different types of transistors, not intended to limit the types of transistors.

Based on the above, in the present application, by setting the transistors included in the light-emitting control unit and the transistors included in the reset unit and the voltage writing unit in the pixel circuit to have different types, basic functions of the pixel circuit are enabled to be achieved while the pixel circuit is controlled only by fewer control signals. Accordingly, on the basis of realizing the basic functions of the pixel circuit (resetting, voltage writing, driving the light-emitting means to emit light), it helps to reduce the volume of the pixel circuit.

Figure 1B:
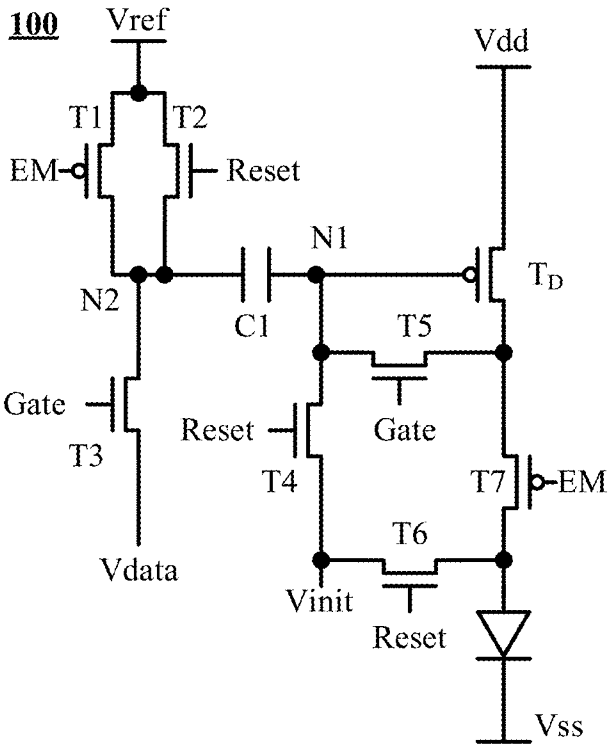
FIG. 1B shows a circuit structure diagram of the pixel circuit 100 according to an embodiment of the present disclosure.

FIG. 1B shows a circuit structure diagram of the pixel circuit 100 according to an embodiment of the present disclosure. Referring to FIG. 1B, each constituent unit of the aforesaid pixel circuit can be described more specifically.

In some embodiments, the reset unit 110 includes a first reset transistor $T_2$, a second reset transistor $T_4$, and a third reset transistor $T_6$.

A gate of the first reset transistor $T_2$ is connected to the reset control signal terminal, a first terminal thereof of the first reset transistor $T_2$ is connected to a first reference voltage terminal, and a second terminal of the first reset transistor $T_2$ is connected to a second node $N_2$. The first reset transistor $T_2$ is configured to write a first reference voltage at the first reference voltage terminal to the second node $N_2$ under control of the reset control signal Reset at the reset control signal terminal.

A gate of the second reset transistor $T_4$ is connected to the reset control signal terminal, a first terminal of the second reset transistor $T_4$ is connected to a first node $N_1$, and a second terminal of the second reset transistor $T_4$ is connected to a second reference voltage terminal. The second reset transistor $T_4$ is configured to write a second reference voltage at the second reference voltage terminal to the first node $N_1$ under control of the reset control signal Reset at the reset control signal terminal.

A gate of the third reset transistor $T_6$ is connected to the reset control signal terminal, a first terminal of the third reset transistor $T_6$ is connected to the second reference voltage terminal, and a second terminal of the third reset transistor $T_6$ is connected to at least one light-emitting means. The third reset transistor $T_6$ is configured to write the second reference voltage at the second reference voltage terminal to an anode of the light-emitting means under control of the reset control signal Reset at the reset control signal terminal.

The reset unit 110 is configured to reset the first node $N_1$, the second node $N_2$ and the anode of the light-emitting means under control of the reset control signal.

The first reference voltage at the first reference voltage terminal and the second reference voltage at the second reference voltage terminal may be set to the same voltage signal according to circuit logic requirements, or may be different voltage signals, such as the first reference voltage is a high level voltage signal, and the second reference voltage is a low level voltage signal. The embodiments of the present disclosure are not affected by the specific voltage values of the first reference voltage and the second reference voltage and their relationship.

Figure 1C:
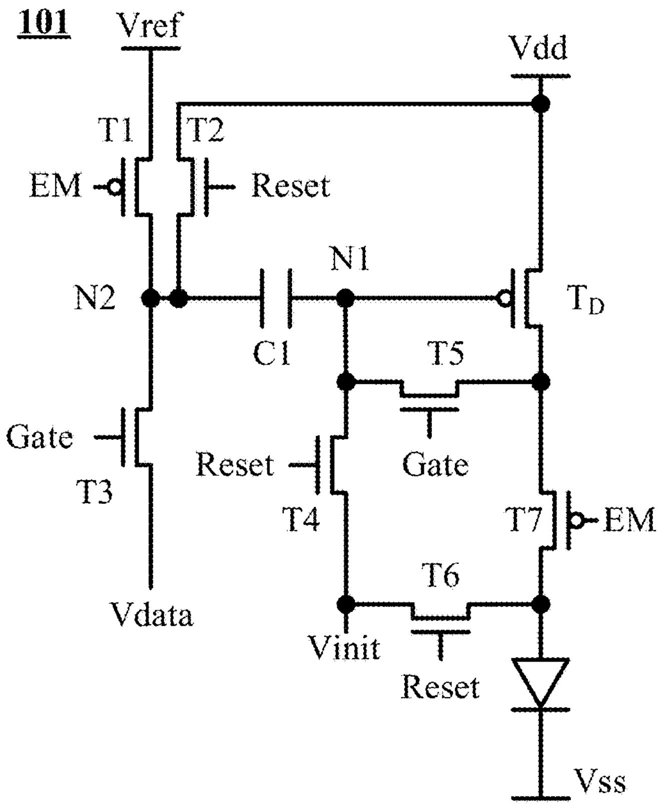
FIG. 1C shows a circuit structure diagram of a variant of the pixel circuit 100 according to an embodiment of the present disclosure.
Figure 1D:
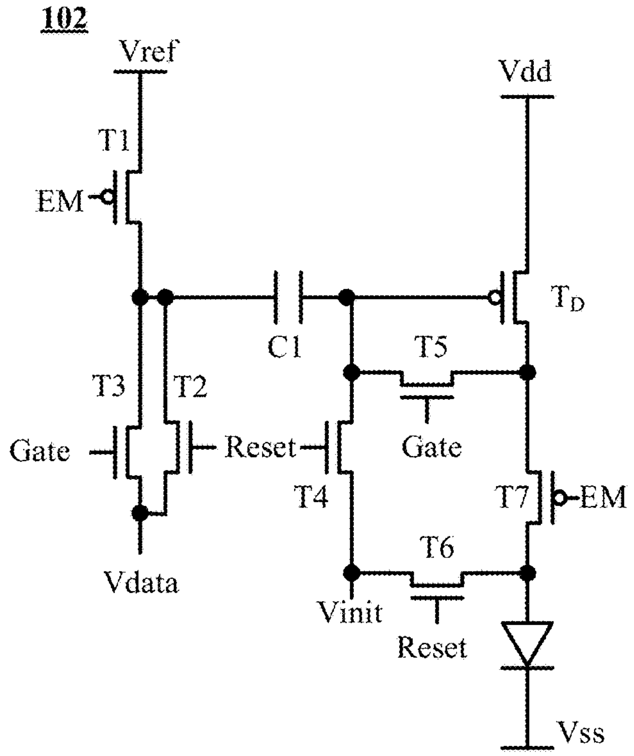
FIG. 1D shows a circuit structure diagram of another variant of the pixel circuit 100 according to an embodiment of the present disclosure.

FIG. 1C shows a circuit structure diagram of a variant of the pixel circuit 100 according to an embodiment of the present disclosure, FIG. 1D shows a circuit structure diagram of another variant of the pixel circuit 100 according to an embodiment of the present disclosure In some embodiments, referring to what is shown in FIGS. 1B, 1C and 1D, the first reference voltage terminal is a reference potential terminal or a power supply voltage terminal or a data line, for respectively outputting the reference potential Vref, the power supply voltage Vdd, or the data signal Vdata as the first reference voltage, or it may also be connected to a preset voltage terminal outside the pixel circuit for transmitting a preset voltage signal. The embodiments of the present disclosure are not limited by the specific type of the first reference voltage terminal.

In some embodiments, the second reference voltage terminal may also be a preset voltage terminal outside the pixel circuit, for outputting a preset voltage signal. The embodiments of the present disclosure are not limited by the specific type of the second reference voltage terminal.

By setting the first reset transistor $T_2$, the second reset transistor $T_4$ and the third reset transistor $T_6$, when receiving the reset control signal at the reset control signal terminal, the pixel circuit separately resets the second node $N_2$, the first node $N_1$, the anode of the light-emitting means to: the first reference voltage, the second reference voltage, the second reference voltage.

In some embodiments, the voltage writing unit 120 includes an input transistor $T_3$, a first compensation transistor $T_5$, and a compensation capacitor $C_1$.

A gate of the input transistor $T_3$ is connected to the scan control signal line, a first terminal the input transistor $T_3$ is connected to the second node $N_2$, and a second terminal the input transistor $T_3$ is connected to the data line. The input transistor $T_3$ is configured to write the data signal Vdata of the data line to the second node $N_2$ under control of the scan control signal Gate.

A gate of the first compensation transistor $T_5$ is connected to the scan control signal line, a first terminal of first compensation transistor $T_5$ is connected to the first node $N_1$, and a second terminal of first compensation transistor $T_5$ is connected to a second terminal of the driving transistor $T_D$ in the light-emitting control unit. The first compensation transistor $T_5$ is configured to connect the second terminal of the driving transistor $T_D$ to the first node $N_1$ under control of the scan control signal Gate, so as to write a voltage that can reflect the threshold voltage of the driving transistor $T_D$ to the first node $N_1$.

A first terminal of the compensation capacitor $C_1$ is connected to the second node $N_2$, and a second terminal of the compensation capacitor $C_1$ is being connected to the first node $N_1$.

Wherein, the voltage writing unit 120 is configured to write the data signal Vdata of the data line to the second node $N_2$ under control of the scan control signal Gate, and store the data signal Vdata and the threshold voltage Vth of the driving transistor between the first node $N_1$ and the second node $N_2$.

By setting the input transistor $T_3$, the first compensation transistor $T_5$ and the compensation capacitor $C_1$, the voltage writing unit 120 can write the data signal Vdata of the data line to the second node $N_2$ in response to the scan control signal Gate, and store the data signal Vdata and the threshold voltage Vth of the driving transistor between the node $N_1$ and the second node $N_2$.

In some embodiments, the light-emitting control unit 130 includes a driving transistor $T_D$, a first light-emitting transistor $T_1$, and a light-emitting control transistor $T_7$.

A gate of the driving transistor $T_D$ is connected to the first node $N_1$, and a first terminal of the driving transistor $T_D$ is connected to the power supply voltage terminal. The driving transistor $T_D$ is controlled by the voltage at the first node $N_1$ so as to be in an on state or an off state.

A gate of the first light-emitting transistor $T_1$ is connected to the light-emitting control signal terminal, a first terminal of the first light-emitting transistor $T_1$ is connected to the reference potential terminal, and a second terminal of the first light-emitting transistor $T_1$ is connected to the second node $N_2$. The first light-emitting transistor $T_1$ is configured to write the reference potential Vref at the reference potential terminal to the second node $N_2$ under control of the light-emitting control signal EM at the light-emitting control signal terminal.

A gate of the light-emitting control transistor $T_7$ is connected to the light-emitting control signal terminal, a first terminal of the light-emitting control transistor $T_7$ is connected to the second terminal of the driving transistor $T_D$, and a second terminal of the light-emitting control transistor $T_7$ is connected to at least one light-emitting means. The light-emitting control transistor $T_7$ is configured to drive the light-emitting means to emit light based on the light-emitting current generated by the driving transistor $T_D$ under control of the light-emitting control signal EM at the light-emitting control signal terminal.

The light-emitting control unit 130 is configured to use the data signal Vdata and the threshold voltage Vth of the driving transistor as stored between the first node $N_1$ and the second node $N_2$ to generate a current that drives the light-emitting means to emit light under control of the light-emitting control signal EM.

The reference potential Vref at the reference potential terminal may be, for example, a high level or a low level. The embodiments of the present disclosure are not limited by the specific value of the reference potential Vref.

By setting the driving transistor $T_D$, the first light-emitting transistor $T_1$ and the light-emitting control transistor $T_7$, the light-emitting control unit can respond to the control of the light-emitting control signal EM, use the data signal and the threshold voltage of the driving transistor as stored between the first node $N_1$ and the second node $N_2$ to generate a current that drives the light-emitting means to emit light.

In some embodiments, the first reset transistor $T_2$, the second reset transistor $T_4$, the third reset transistor $T_6$, the input transistor $T_3$ and the first compensation transistor $T_5$ all are N-type oxide thin film transistors, the driving transistor $T_D$, the first light-emitting transistor $T_1$ and the light-emitting control transistor $T_7$ all are P-type low-temperature polysilicon thin film transistors.

By setting the transistors $T_2$, $T_3$, $T_4$, $T_5$, and $T_6$ all as N-type oxide thin film transistors, the active levels of the scan control signal Gate and the reset control signal Reset of the pixel circuit are both high level signals, which can reduce the number of GOA circuits that are used to generate the control signals. At the same time, there are fewer low-temperature polysilicon thin film transistors in the circuit, which is beneficial to reduce its power consumption.

According to another aspect of the present disclosure, a method 200 for driving the pixel circuit as described above is provided.

Figure 2A:
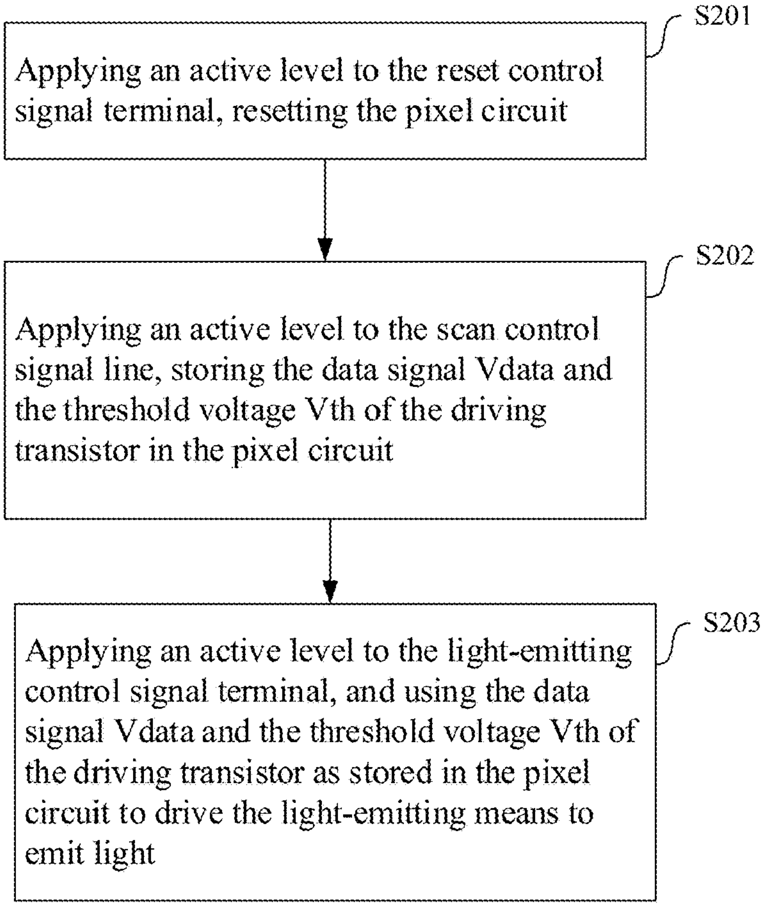
FIG. 2A shows a flowchart of a driving method 200 for a pixel circuit according to an embodiment of the present disclosure.
Figure 2B:
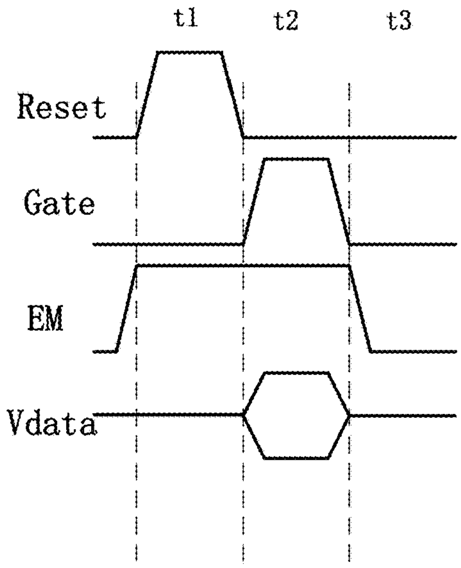
FIG. 2B shows a operation timing diagram of a pixel circuit according to an embodiment of the present disclosure.

FIG. 2A shows a flowchart of a driving method 200 for a pixel circuit according to an embodiment of the present disclosure; FIG. 2B shows a operation timing diagram of a pixel circuit according to an embodiment of the present disclosure. Referring to FIGS. 2A and 2B, the driving method 200 for a pixel circuit can be described in more detail.

As shown in FIG. 2A, first, in step S201, an active level is applied to the reset control signal terminal to reset the pixel circuit. The applied active level may be, for example, a high level signal, or it may also be a low level signal, the embodiments of the present disclosure are not limited by the specific level that is set.

Taking the pixel circuit described in FIG. 1B as an example, wherein the reference potential Vref is a high level, and the second reference voltage Vinit is a low level. As shown in FIG. 2B, when a high level signal is applied to the reset signal terminal, a low level signal is applied to the scan signal line, and a high level signal is applied to the light-emitting control signal terminal. At this time, the transistors $T_2$, $T_4$, and $T_6$ in the pixel circuit are turned on and the other transistors are turned off, this process resets the level of the first node $N_1$ to the potential of the second reference voltage Vinit, which is a low level. In addition, the potential of the second node $N_2$ is reset to the potential of the reference potential Vref, and the anode of the light-emitting means OLED is reset to the potential of the second reference voltage Vinit. Thereby, the pixel circuit is initialized.

Next, in step S202, an active level is applied to the scan control signal line, and the data signal Vdata of the data line and the threshold voltage Vth of the driving transistor are stored in the pixel circuit.

Taking the pixel circuit described in FIG. 1B as an example, as shown in FIG. 2B, when the signal applied to its reset signal terminal changes to a low level signal, the scan control signal line changes to be applied with a high level signal, and the light-emitting control signal terminal continues to be applied with a high level signal. Therefore, in the pixel circuit, the transistors $T_2$ and $T_4$ are turned off, the transistors $T_3$ and $T_5$ are turned on, and the gate of the driving transistor $T_D$ is turned on because it is set to a low level in the previous phase, then Vdd starts to charge the first node $N_1$ through the driving transistor $T_D$ until the first node $N_1$ is charged to Vdd−Vth, wherein Vth represents the threshold voltage of the driving transistor $T_D$. Because the second terminal of the compensation capacitor $C_1$ is connected to the first node $N_1$, the potential of the second terminal of the compensation capacitor $C_1$ is Vdd−Vth. The first terminal of the compensation capacitor $C_1$ is connected to the second node $N_2$, because the second node $N_2$ is connected to the data line through the input transistor $M_5$, the potential of the first terminal of the compensation capacitor $C_1$ is the potential of the second node $N_2$, which is the data signal Vdata, the voltage difference across two terminals of the compensation capacitor $C_1$ is Vdd−Vth−Vdata, this phase is the charging phase of the pixel circuit, and is also the data signal writing phase of the pixel circuit.

Finally, in step S203, an active level is applied to the light-emitting control signal terminal, the data signal Vdata and the threshold voltage Vth of the driving transistor as stored in the pixel circuit are used to drive the light-emitting means to emit light.

Taking the pixel circuit described in FIG. 1B as an example, as shown in FIG. 2B, when the reset signal terminal continues to be applied with a low level signal, the scan control signal line changes to be applied with a low level signal, and the light-emitting control signal terminal changes to be applied with a low level signal. Therefore, transistors T3 and T5 in the pixel circuit are turned off, the transistors T1 and T7 are turned on, and the reference potential Vref is written to the second node N2, at this time, because the voltage across two terminals of the capacitor C1 cannot abruptly change, the voltage of the first node N1 changes to Vdd−Vth−Vdata+Vref, the driving transistor TD is turned on, thereby driving the light-emitting means to start light-emitting display.

The driving current $I_{OLED}$ generated by the driving transistor $T_D$ can be expressed by the following formula:

$$I_{OLED}=K(V_{GS}-Vth)^2=K[Vdd-(Vdd-Vth-V\text{data}+V\text{ref})-Vth]^2=K(V\text{data}-V\text{ref})^2 \quad (1)$$

wherein $V_{GS}$ is the voltage between the gate and drain of the transistor.

It can be known from the above Equation (1) that the driving current $I_{OLED}$ is not affected by the threshold voltage Vth of the driving transistor $T_D$, and is only related to the data signal Vdata inputted by the data line. Therefore, the influence of the threshold voltage Vth drift of the driving transistor $T_D$ due to the manufacturing process and the long-term operation on the driving current $I_{OLED}$ outputted by the driving transistor $T_D$ is eliminated, thereby the uniformity of light-emitting display is ensured and the display quality is improved.

By setting the driving method for the pixel circuit, the driving control for the pixel circuit can be realized by fewer control signals (for example, only the reset control signal Reset, the scan control signal Gate, and the light-emitting control signal EM), so that the pixel circuit realizes the corresponding functions, the number of control signals is fewer and the logic is simple, which is conducive to achieving fast and efficient control of the process.

Figure 3A:
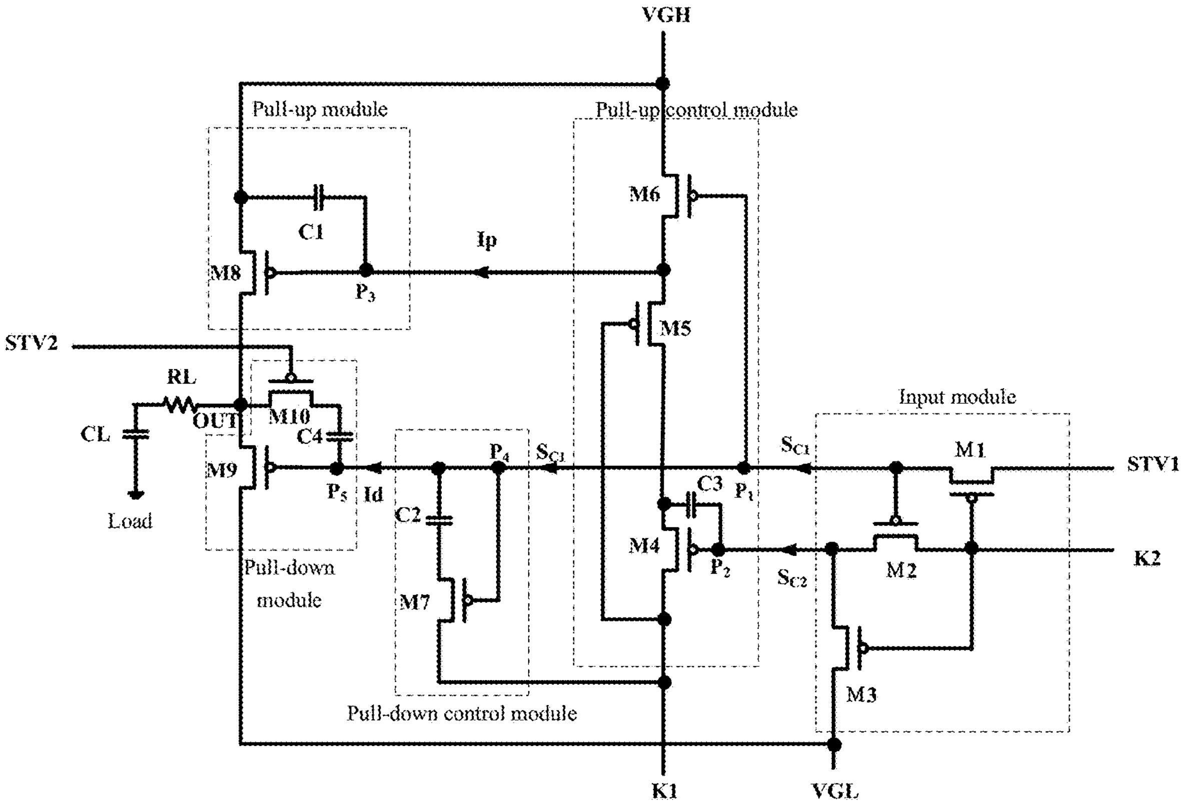
FIG. 3A shows a circuit diagram of a GOA unit according to an embodiment of the present disclosure.

In order to generate the above control signals (the reset control signal Reset, the scan control signal Gate, and the light-emitting control signal EM), a GOA unit is required. FIG. 3A shows a circuit diagram of a GOA unit according to an embodiment of the present disclosure.

Referring to FIG. 3A, in some embodiments, the GOA unit includes an input module, a pull-up control module, a pull-up module, a pull-down control module, a pull-down module.

The input module is connected to the second power supply terminal, the second clock terminal and the first input terminal, and is configured to generate and output a first control signal $S_{C1}$ according to a first input signal STV1 of the first input terminal and generate and output a second control signal $S_{C2}$ according to the second power supply signal at the second power supply terminal when the second clock signal K2 of the second clock terminal is at an active level.

The pull-up control module is connected to the input module, the first power supply terminal and the first clock terminal, has a first control input node $P_1$ and a second control input node $P_2$, and is configured to write the first control signal $S_{C1}$ and the second control signal $S_{C2}$ as received from the input module into the first control input node $P_1$ and the second control input node $P_2$ respectively, and generate and output a pull-up control signal Ip when the first control input node $P_1$ is at an inactive level and the second control input node $P_2$ and the first clock signal K1 at the first clock terminal both are at an active level.

The pull-up module is connected to the pull-up control module, the first power supply terminal and the signal output terminal, and has a pull-up input node $P_3$, the pull-up module is configured to cause the pull-up input node $P_3$ to be at an active level to write the first power supply signal of the first power supply terminal to the signal output terminal under control of the pull-up control signal Ip.

The pull-down control module is connected to the input module and the first clock terminal, and has a pull-down control input node $P_4$, the pull-down control module is configured to cause the pull-down control input node $P_4$ to be at an active level and output a pull-down control signal Id under control of the first control signal $S_{C1}$.

The pull-down module is connected to the pull-down control module, the second power supply terminal, the second input terminal and the signal output terminal, and has a pull-down input node $P_5$, the pull-down module is configured to cause the pull-down input node $P_5$ to be at an active level to write the second power supply signal of the second power supply terminal to the signal output terminal under control of the pull-down control signal Id.

In some embodiments, the pull-down module includes a pull-down transistor $M_9$, a tenth transistor $M_{10}$, a fourth capacitor $C_4$.

A gate of the pull-down transistor $M_9$ is connected to the pull-down input node $P_5$, a first terminal of the pull-down transistor $M_9$ is connected to the signal output terminal, and a second terminal of the pull-down transistor $M_9$ is connected to the second power supply terminal. The pull-down transistor $M_9$ is configured to write the second power supply signal of the second power supply terminal to the signal output terminal when the pull-down input node $P_5$ is at an active level.

A gate of the tenth transistor $M_{10}$ is connected to the second input terminal, and a first terminal of the tenth transistor $M_{10}$ is connected to the signal output terminal; the tenth transistor $M_{10}$ is controlled by the second input signal STV2 of the second input terminal to be in an on state or an off state.

A first terminal of the fourth capacitor $C_4$ is connected to a second terminal of the tenth transistor $M_{10}$ and a second terminal of the fourth capacitor $C_4$ is being connected to the pull-down input node $P_5$.

The above-mentioned active level and inactive level are only used to distinguish the different level states of the signal, for example, the active level is high level, the inactive level is low level; or the active level may also be a low level, the inactive level is a high level, the embodiments of the present disclosure are not limited by the specific level signals of the active level and the inactive level.

By setting the pull-down transistor $M_9$, the tenth transistor $M_{10}$ and the fourth capacitor $C_4$ in the pull-down module, in the pull-down phase of the GOA unit, based on the joint action of the tenth transistor $M_{10}$ and the fourth capacitor $C_4$, a stepless reduction of the output signal is achieved when the second power supply signal at a low level is written to the signal output terminal in the pull-down operating phase of the GOA unit.

In some embodiments, the input module includes: a first transistor $M_1$, a second transistor $M_2$ and a third transistor $M_3$.

A gate of the first transistor $M_1$ is connected to the second clock terminal, a first terminal of the first transistor $M_1$ is connected to the first control input node $P_1$, and a second terminal of the first transistor $M_1$ is connected to the first input terminal, for generating the first control signal $S_{C1}$ based on the first input signal STV1 of the first input terminal under control of the second clock signal at the second clock terminal. A gate of the second transistor $M_2$ is connected to the first control input node $P_1$, a first terminal of the second transistor $M_2$ is connected to the second control input node $P_2$, and a second terminal of the second transistor $M_2$ is connected to the second clock terminal. A gate of the third transistor $M_3$ is connected to the second clock terminal, a first terminal of the third transistor $M_3$ is connected to the second control input node $P_2$, and a second terminal of the third transistor $M_3$ is connected to the second power supply terminal, for generating a second control signal $S_{C2}$ based on the second power supply signal at the second power supply terminal under control of the second clock signal K2 at the second clock terminal.

In some embodiments, the pull-up control module includes a fourth transistor $M_4$, a fifth transistor $M_5$, a sixth transistor $M_6$ and a third capacitor $C_3$.

A gate of the fourth transistor $M_4$ is connected to the second control input node $P_2$, a first terminal of the fourth transistor $M_4$ is connected to a second terminal of the fifth transistor $M_5$, and a second terminal of the fourth transistor $M_4$ is connected to the first clock terminal. A gate of the fifth transistor $M_5$ is connected to the first clock terminal, and a first terminal of the fifth transistor $M_5$ is connected to the pull-up input node $P_3$. A gate of the sixth transistor $M_6$ is connected to the first control input node $P_1$, a first terminal of the sixth transistor $M_6$ is connected to the first power supply terminal, and a second terminal of the sixth transistor $M_6$ is connected to the pull-up input node $P_3$. A first terminal of the third capacitor $C_3$ is connected to the first terminal of the fourth transistor $M_4$, and a second terminal of the third capacitor $C_3$ is connected to the second control input node $P_2$.

In some embodiments, the pull-up module includes a first capacitor $C_1$ and an eighth transistor $M_8$.

A first terminal of the first capacitor $C_1$ is connected to the first power supply terminal, and a second terminal of the first capacitor $C_1$ is connected to the pull-up input node $P_3$. A gate of the eighth transistor $M_8$ is connected to the pull-up input node $P_3$, a first terminal of the eighth transistor $M_8$ is connected to the first power supply terminal, and a second terminal of the eighth transistor $M_8$ is connected to the signal output terminal.

In some embodiments, the pull-down control module includes a seventh transistor $M_7$ and a second capacitor $C_2$.

A gate of the seventh transistor $M_7$ is connected to the pull-down control input node $P_4$, and a second terminal of the seventh transistor $M_7$ is connected to the first clock terminal. A first terminal of the second capacitor $C_2$ is connected to the pull-down control input node $P_4$, and a second terminal of the second capacitor $C_2$ is connected to the first terminal of the seventh transistor $M_7$.

Figure 3B:
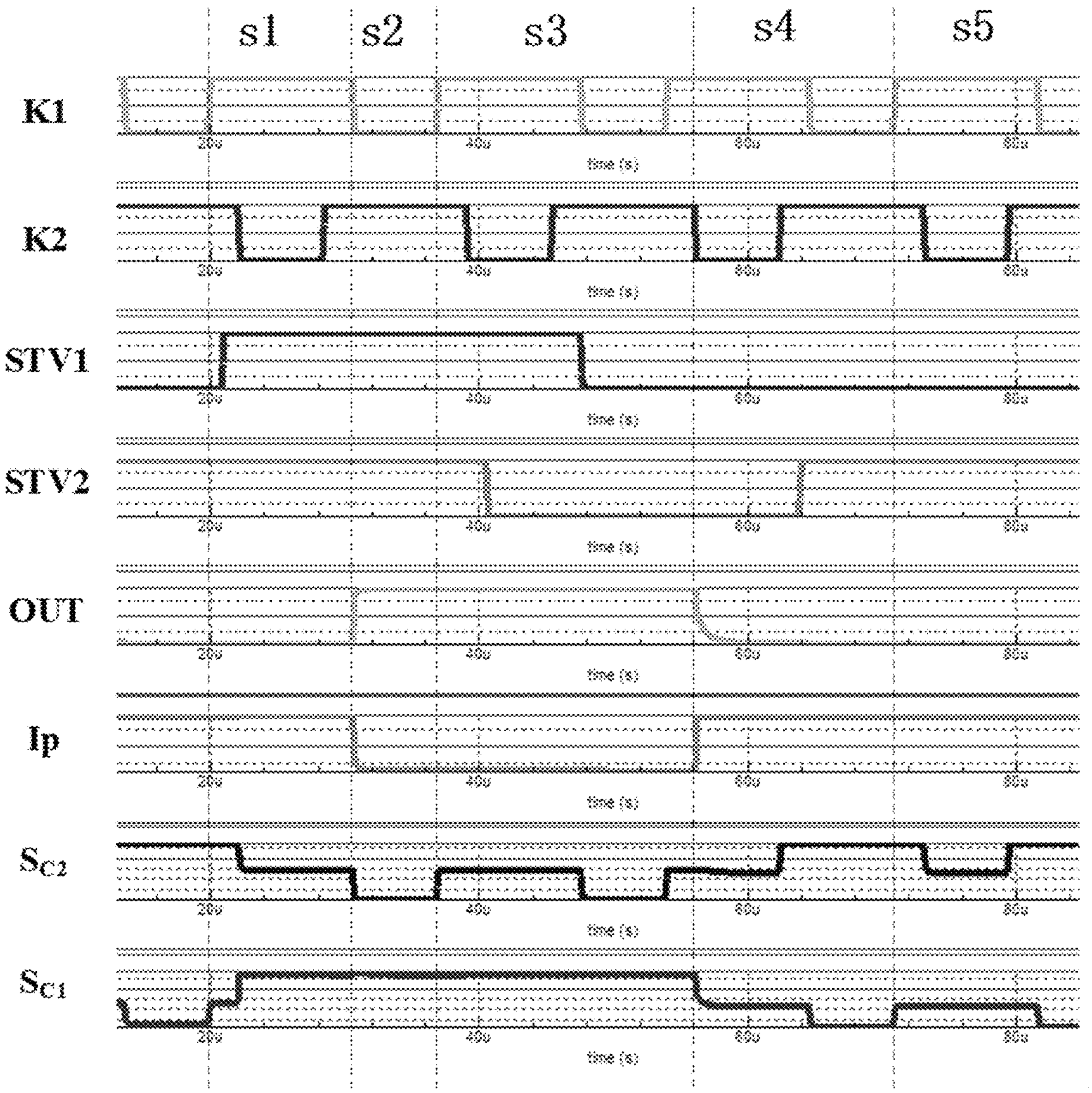
FIG. 3B shows a timing diagram of a GOA unit according to an embodiment of the present disclosure.

FIG. 3B further illustrates a timing diagram of a GOA unit according to an embodiment of the present disclosure.

Referring to FIG. 3B, next, the working flow of the GOA circuit unit will be explained. For each GOA circuit unit, its work flow can be divided into 5 phases.

As shown in FIG. 3B, the first power supply signal of the first power supply terminal is, for example, a high level signal VGH, the second power supply signal of the second power supply terminal is a low level signal VGL, the first clock signal, the second clock signal, the first input signal and the second input signal all use a low level as an active level, and the threshold voltage of each transistor herein is set as Vth.

In the first operating phase $s_1$ (preliminary phase), when the first clock signal K1 of the first clock terminal is a high level, the first input signal STV1 of the first input terminal jumps to a high level, the second clock signal of the second clock terminal K2 jumps to a low level, at this time the transistor $M_1$ is turned on, the first control signal $S_{C1}$ of a high level is generated according to the first input signal STV1, and the first control signal $S_{C1}$ is written to the first control input node $P_1$, so that the transistors $M_2$, $M_6$, $M_7$ are closed. The low level of the second clock signal K2 turns on the transistor $M_3$, the second control signal $S_{C2}$ of a low level is generated, the potential of the second control input node $P_2$ is pulled down to VGL+Vth, the transistor $M_4$ is turned on, the high level of the first clock signal K1 is transferred to the first terminal of the fourth transistor $M_4$, and the potential difference across two terminals of the capacitor $C_3$ is VGH−VGL−Vth. At this time, the output signal OUT is a low level, and the pull-up input node $P_3$ is at a high level.

In the second operating phase 52 (pull-up phase), the first clock signal K1 of the first clock terminal jumps to a low level, the second clock signal K2 of the second clock terminal jumps to a high level, the input signal STV1 of the first input terminal remains at a high level. Because a potential has been stored in the capacitor $C_3$ in the first phase, when the first clock signal K1 jumps to the low level VGL, the storage potential of the capacitor $C_3$ cannot abruptly change, the level of the second control input node $P_2$ will be raised to 2VGL−VGH+2Vth by the capacitor, so that the transistor $M_4$ can be turned on well, the first clock signal K1 of a low level is transmitted to the first terminal of the fourth transistor $M_4$ without threshold loss. The first clock signal K1 turns on the transistor $M_5$, a pull-up control signal Ip is generated, the potential of the pull-up input node $P_3$ is pulled down to the low level VGL, the transistor $M_8$ is turned on, the output signal OUT is pulled up to the high level of the first power supply terminal signal VGH.

In the third operating phase $s_3$ (high level maintenance phase), the first clock signal K1 of the first clock terminal jumps to a high level, the second clock signal K2 of the second clock terminal jumps to a low level, the first input signal STV1 is still a high level, the second input signal STV2 is a low level, the transistor $M_{10}$ is turned on, the capacitor $C_4$ is connected to the circuit, at this time, the first terminal of the capacitor $C_4$ is a high level VGH, the second terminal of the capacitor $C_4$ is connected to the pull-down input node $P_5$, then the high level VGH charges the pull-down input node $P_5$ through the transistor $M_9$ until the pull-down input node $P_5$ is charged to VGH−Vth, and the voltage difference across two terminals of the capacitor $C_4$ is Vth. In this case, during the high and low jumps of K1 and K2, as long as the time when STV1 jumps to a low level is not the time when K2 jumps to a low level, the output signal of the GOA circuit unit will always remain at a high level, and the pull-up input node $P_3$ is always a low level.

In the fourth operating phase $s_4$ (pull-down phase), the first clock signal K1 of the first clock terminal is a high level, the second clock signal K2 of the second clock terminal is a low level, the first input signal STV1 and the second input signal STV2 both are a low level VGL. At this time, the transistor $M_1$ is turned on, the first control signal $S_{C1}$ of a low level is generated, so that the pull-down control input node P4 is at a low level, then the pull-down control signal Id is outputted so that the pull-down input node $P_5$ is at a low level, the transistor $M_9$ is turned on, the output signal OUT at the signal output terminal will be pulled down, and the pull-up input node $P_3$ will jump to a high level.

Figure 3C:
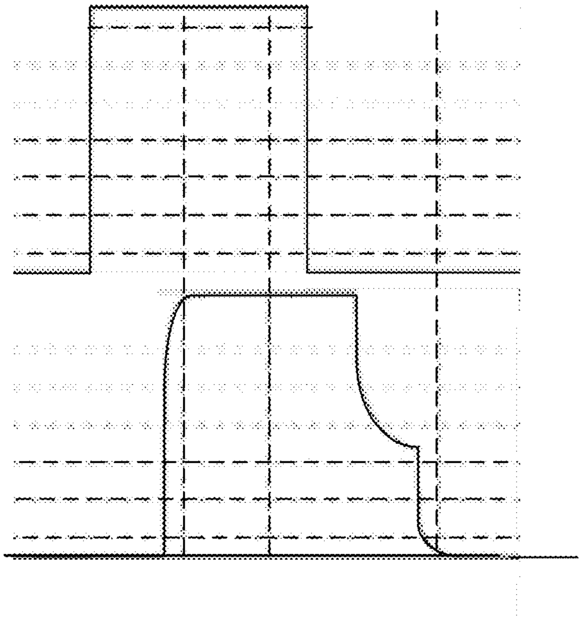
FIG. 3C shows a waveform diagram of an output signal OUT in a pull-down phase in the case where the GOA unit is not provided with the capacitor C4 and the transistor M10 according to an embodiment of the present disclosure.

FIG. 3C shows a waveform diagram of the output signal OUT in the pull-down phase in the case where the GOA unit is not provided with the capacitor $C_4$ and the transistor $M_{10}$ according to an embodiment of the present disclosure.

Referring to FIG. 3C, the process can be described more specifically. When the capacitor $C_4$ and the transistor $M_{10}$ are not present in the circuit, because the P-type thin film transistor has a threshold loss when forwarding the low potential, so that the potential of the pull-down input node $P_5$ is pulled to VGL+Vth, which further turns on the transistor $M_9$, at this time, the potential of the output signal OUT of the signal output terminal will be pulled down to VGL+Vth+Vth, instead of VGL. During this process, the output signal OUT will exhibit the first-phase falling waveform shown in FIG. 3C. In addition, because the low potential of the pull-down control input node $P_4$ causes the transistor $M_7$ to turn on, the first terminal of the capacitor $C_2$ is connected to the pull-down input node $P_5$, and the second terminal of the capacitor $C_2$ is set to the high level VGH by the first clock signal, then at this time there is a negative potential VGL+Vth−VGH across two terminals of the capacitor $C_2$. Subsequently, when the first clock signal K1 jumps to the low level VGL, the voltage at the second terminal of the capacitor $C_2$ changes to VGL+Vth. Because the voltage of the capacitor $C_2$ cannot abruptly change, the potential of the pull-down input node $P_5$ jumps to a lower potential 2VGL+2Vth-VGH, at this time, the transistor $M_9$ is fully turned on, the output signal OUT of the signal output terminal is pulled down to VGL, therefore, the waveform of the output signal OUT will exhibit a falling edge with steps.

In the circuit described in the present application, by adding the capacitor $C_4$ and the transistor $M_{10}$, referring to FIG. 2B, in the pull-down phase, the first control signal $S_{C1}$ of a low level is generated, the pull-down control signal Id is generated based on the first control signal $S_{C1}$, so that the potential of the pull-down input node $P_5$ is pulled to VGL+Vth, as a result, the transistor $M_9$ is turned on, the output signal OUT of the signal output terminal will be pulled down to VGL+Vth+Vth. Because the potential Vth has been stored in the capacitor $C_4$ in the third phase and the voltage across two terminals of the capacitor $C_4$ cannot abruptly change, so when the output signal OUT is pulled down, the potential of the pull-down input node $P_5$ will be pulled down to the potential OUT−Vth, the transistor $M_9$ is turned on more fully, finally the potential of the pull-down input node $P_5$ will be VGL−Vth, so as to pass the low level signal VGL of the second power supply terminal to the signal output terminal without threshold loss, thereby making the waveform of the output signal exhibit a falling edge without steps.

In the fifth operating phase $s_5$ (low level maintenance phase), the first input signal STV1 is always at a low level, the second input signal STV2 is at a high level, and the capacitor $C_4$ is no longer connected to the circuit, so that the output signal of the signal output terminal OUT can be maintained at a low level well.

However, it should be understood that the GOA unit described in the present application is not limited to the above described workflow. For example, it may not include a high level maintenance phase, or it may not include a low level maintenance phase, as long as it can implement a preset signal output function.

By providing the aforesaid GOA unit, and further, by providing the fourth capacitor $C_4$ and the tenth transistor $M_{10}$ in the pull-down module, the GOA unit can generate the respective control signals described in the present application, and the GOA unit can form a falling edge without steps from a high level to a low level in the pull-down phase, which is beneficial to the output of an active control signal and avoids a control logic error due to a stepped falling edge of the output.

Figure 4A:
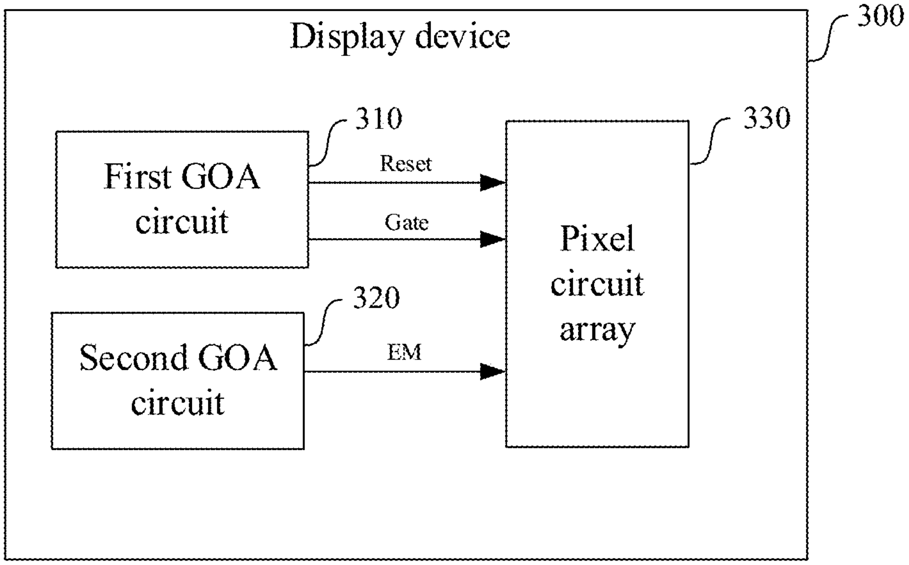
FIG. 4A shows a schematic diagram of a display device 300 according to an embodiment of the present disclosure.

According to another aspect of the present disclosure, a display device 300 is provided, and FIG. 4A shows a schematic diagram of the display device 300. Referring to FIG. 4A, the display device 300 includes a pixel circuit array 330, a first GOA circuit 310 and a second GOA circuit 320.

The pixel circuit array 330 includes a plurality of the pixel circuit 100 as described above, the first GOA circuit 210 and the second GOA circuit 320 provide three control signals to each pixel circuit 100 in the pixel circuit array 300, a reset control signal Reset, a scan control signal Gate, and a light-emitting control signal EM.

The first GOA circuit 310, that is, the gated driving circuit, is configured to provide the reset control signal Reset and the scan control signal Gate to the pixel circuit; the second GOA circuit 320, that is, the light-emitting control driving circuit, is configured to provide the light-emitting control signal EM to the pixel circuit.

However, the embodiments of the present disclosure are not limited to this, in some embodiments, the second GOA circuit 320 is configured to provide the reset control signal Reset and the scan control signal Gate to the pixel circuit; the first GOA circuit 310 is configured to provide the light-emitting control signal EM to the pixel circuit.

By providing the above display device, only the GOA circuit 310 and the second GOA circuit 320 can provide the reset control signal Reset, the scan control signal Gate, and the light-emitting control signal EM for each pixel circuit in the pixel circuit array 330, which realizes good sequential logic control of the pixel circuit and completes the corresponding display device function. At the same time, the display device has a simpler structure and has a smaller volume, which is beneficial to the design of narrow frame.

In some embodiments, the first GOA circuit 310 and the second GOA circuit 320 generate the reset control signal Reset, the scan control signal Gate, and the light-emitting control signal EM as shown in FIG. 2B, the reset control signal Reset and the scan control signal Gate have different start time and the same duration; the reset control signal Reset and the light-emitting control signal EM have the same start time, the light-emitting control signal EM has a duration longer than that of the reset control signal Reset. Preferably, the duration of the light-emitting control signal EM is twice or more than the duration of the reset control signal Reset.

By setting the first GOA circuit 310 and the second GOA circuit 320 to generate a reset control signal Reset, the scan control signal Gate and the light-emitting control signal EM, and further setting the timing logic relationship of the respective signals generated and their durations, it is helpful for achieving good control of the pixel circuit and avoiding erroneous display of the display device due to chaotic logic of the control signals.

In some embodiments, the first GOA circuit and the second GOA circuit are the same GOA circuit, and the first GOA circuit and the second GOA circuit both receive a first power supply signal, a second power supply signal, and a clock signal.

The first GOA circuit and the second GOA being the same GOA circuit means that the first GOA circuit and the second GOA circuit have the same circuit structure.

The first power supply signal and the second power supply signal may be the same signal, for example, they are both high level signals, or they may be different signals, for example, the first power supply signal is a high level signal and the second power source signal is a low level signal, the embodiments of the present disclosure are not limited by the specific signal content and relationship of the first power supply signal and the second power supply signal.

The clock signal may, for example, further include a first clock signal and a second clock signal. The embodiments of the present disclosure are not limited by the specific composition and the content signal of the clock signal.

Based on the above, by setting the first GOA circuit and the second GOA circuit as the same GOA circuit, it helps to simplify the design process of the GOA circuit; on the other hand, by making the first GOA circuit and the second GOA circuit share the same signals (the first power supply signal, the second power supply signal, and the clock signal), it benefits the timing logic control of the first GOA circuit and the second GOA circuit, so that they are enabled to provide the pixel circuit with the reset control signal Reset, the scan control signal Gate, and the light-emitting control signal EM as described above.

Figure 4B:
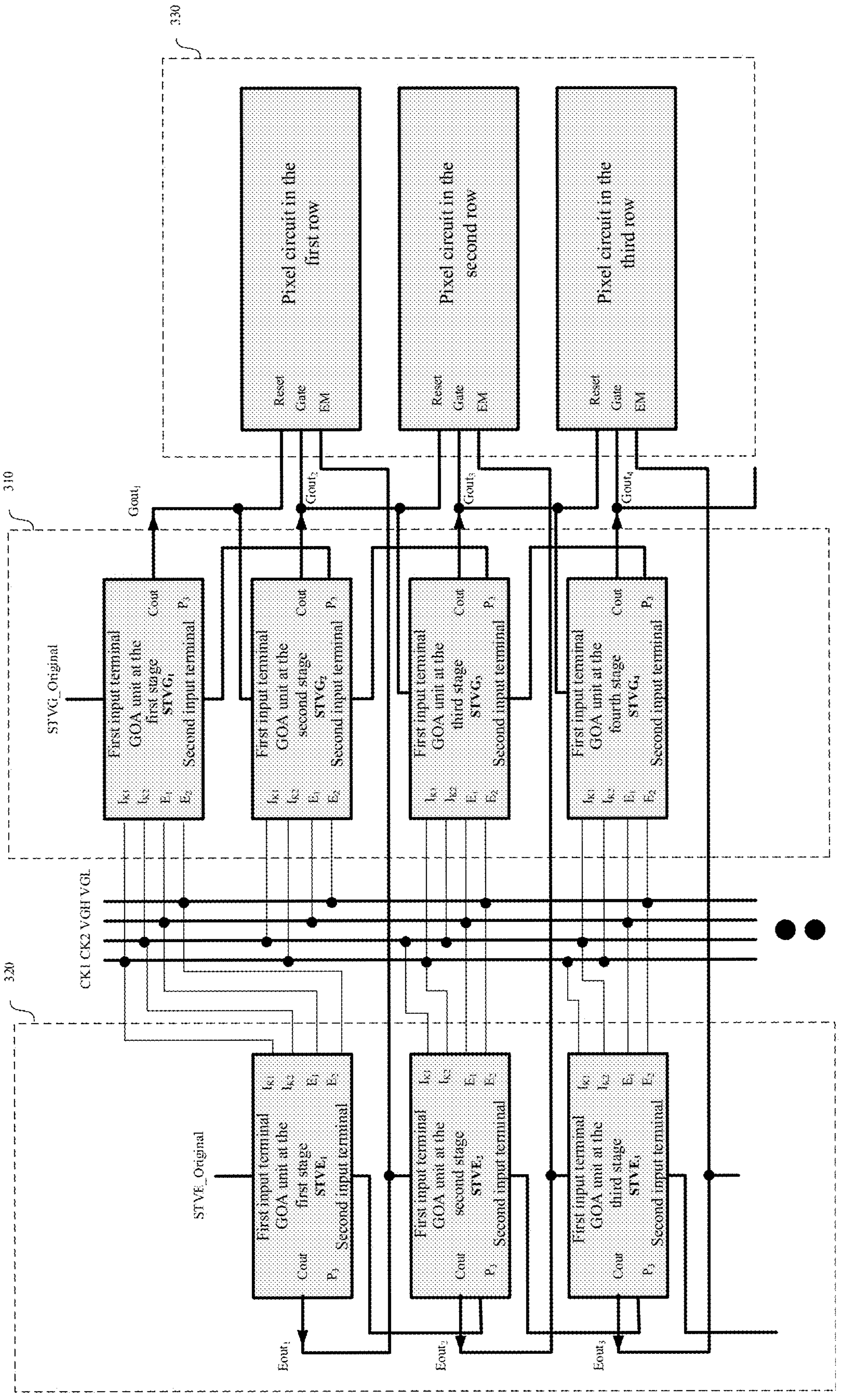
FIG. 4B shows a circuit structure diagram of the display device 300 according to an embodiment of the present disclosure.

FIG. 4B shows a circuit structure diagram of the display device 300 according to an embodiment of the present disclosure.

Referring to FIG. 4B, in some embodiments, each of the first GOA circuit 310 and the second GOA circuit 320 includes a plurality of cascaded GOA units as described above, and each GOA unit includes a first power supply terminal, a second power supply terminal, a first input terminal, a second input terminal, a signal output terminal Cout, and a pull-up input node $P_3$.

A signal output terminal Cout of the GOA unit at each stage is connected to a first input terminal of the GOA unit at an adjacent next stage. A second input terminal of the GOA unit at each stage is connected to a pull-up input node $P_3$ of the GOA unit at an adjacent next stage.

Specifically, in the first GOA circuit 310, the signal output terminal of the GOA unit at each stage is connected to the reset control signal terminal of the corresponding pixel circuit at the same stage, so as to provide the reset control signal Reset to the pixel circuit; except the GOA unit at the last stage, the signal output terminal of the GOA unit at each stage is also connected to the first signal input terminal of the GOA unit at a next stage, so as to provide the first input signal required for operation of the GOA unit at a next stage; except the GOA unit at the first stage, the pull-up input node $P_3$ of the GOA unit at each stage is connected to the second input terminal of the GOA unit at a previous stage, so as to provide the second input signal to the GOA unit at a pervious stage; except the GOA unit at the first stage, the output terminal of the GOA unit at each stage is also connected to the scan control signal terminal of the corresponding pixel circuit at the same stage, so as to provide the scan control signal Gate to the pixel circuit.

In the second GOA circuit 320, the signal output terminal of the GOA unit at each stage is connected to the light-emitting control signal terminal of the corresponding pixel circuit at the same stage, so as to provide the light-emitting control signal EM to the pixel circuit; except the GOA unit at the last stage, the signal output terminal of the GOA unit at each stage is also connected to the first signal input terminal of the GOA unit at an adjacent next stage, so as to provide the first input signal required for operation of the GOA unit at a next stage; except the GOA unit at the first stage, the pull-up input node $P_3$ of the GOA unit at each stage is connected to the second input terminal of the GOA unit at a previous stage, so as to provide the second input signal to the GOA unit at a pervious stage.

First power supply terminals $E_1$ of all the GOA units receive the first power supply signal, second power supply terminals $E_2$ of all the GOA units receive the second power supply signal.

For example, as shown in FIG. 4B, the first power terminals E1 of all the GOA units are connected to the high level signal VGH, and the second power terminals E2 of all the GOA units are connected to the low level signal VGL.

A first clock signal at a first clock terminal of the GOA unit at each stage is the same as the second clock signal at a second clock terminal of the GOA unit at an adjacent next stage; the second clock signal at the second clock terminal of the GOA unit at each stage is the same as the first clock signal at the first clock terminal of the GOA unit at an adjacent next stage.

For example, taking the GOA unit at the first stage and the GOA unit at the second stage in the GOA circuit 310 as an example, if the first clock signal STVG1_K1 received by the first clock terminal $I_{K1}$ of the GOA unit $STVG_1$ at the first stage is a clock signal CK1, the second clock signal STVG1_K2 received by the second clock terminal $I_{K2}$ thereof is the clock signal CK2, then for the GOA unit $STVG_2$ at the second stage, the first clock signal STVG2_K1 received by the first clock terminal $IK_1$ is the clock signal CK2, the second clock signal STVG2_K2 received by the clock terminal $I_{K1}$ is the clock signal CK1.

Based on the above cascading relationship, further, in order to achieve effective control of the pixel circuit as described above, the output signals of the GOA unit $STVG_1$ at the first stage in the first GOA circuit and the GOA unit $STVG_1$ at the first stage in the second GOA circuit are set to have the following timing relationship.

Specifically, it is set that when the GOA unit $STVG_1$ at the first stage of the first GOA circuit is in an active operating state, the GOA unit $STVE_1$ at the first stage of the second GOA circuit is in an inactive operating state, then the signal output terminal of the GOA unit $STVG_1$ at the first stage outputs an output signal $Gout_1$ having an active level, the signal output terminal of the GOA unit $STVE_1$ at the first stage outputs an output signal Eout1 having an inactive level.

Further, the start time of the active level of the output signal $Gout_1$ of the GOA unit $STVG_1$ at the first stage and the start time of the inactive level of the output signal $Eout_1$ of the GOA unit $STVE_1$ at the first stage of the second GOA circuit are set to be the same, and the duration of the active level of the output signal $Gout_1$ is less than the duration of inactive level of the output signal $Eout_1$ of the GOA unit $STVE_1$ at the first stage of the second GOA circuit. Preferably, the duration of the inactive level of the output signal $Eout_1$ is greater than or equal to twice of the duration of the active level of the output signal $Gout_1$.

Based on the above timing relationship setting, on the basis of the cascading relationship as described above, for the first GOA circuit, when the GOA unit at each stage and the GOA unit at a next stage thereof are in an effective operating state in turn and sequentially output signals having an active level, the output signals of the GOA units at the corresponding stages of the second GOA circuit are all at an inactive level. Thereby, orderly output of the control signal for the pixel circuit described above can be realized.

By setting the connection relationship and the timing relationship of the plurality of GOA units in each of the first GOA circuit 310 and the second GOA circuit 320, it is beneficial to achieve good output of the control signal, ensure effective control of the pixel circuit.

Based on the above operating timing relationship, according to another aspect of the present disclosure, a method 500 for driving the display device as described above is also provided.

Figure 5A:
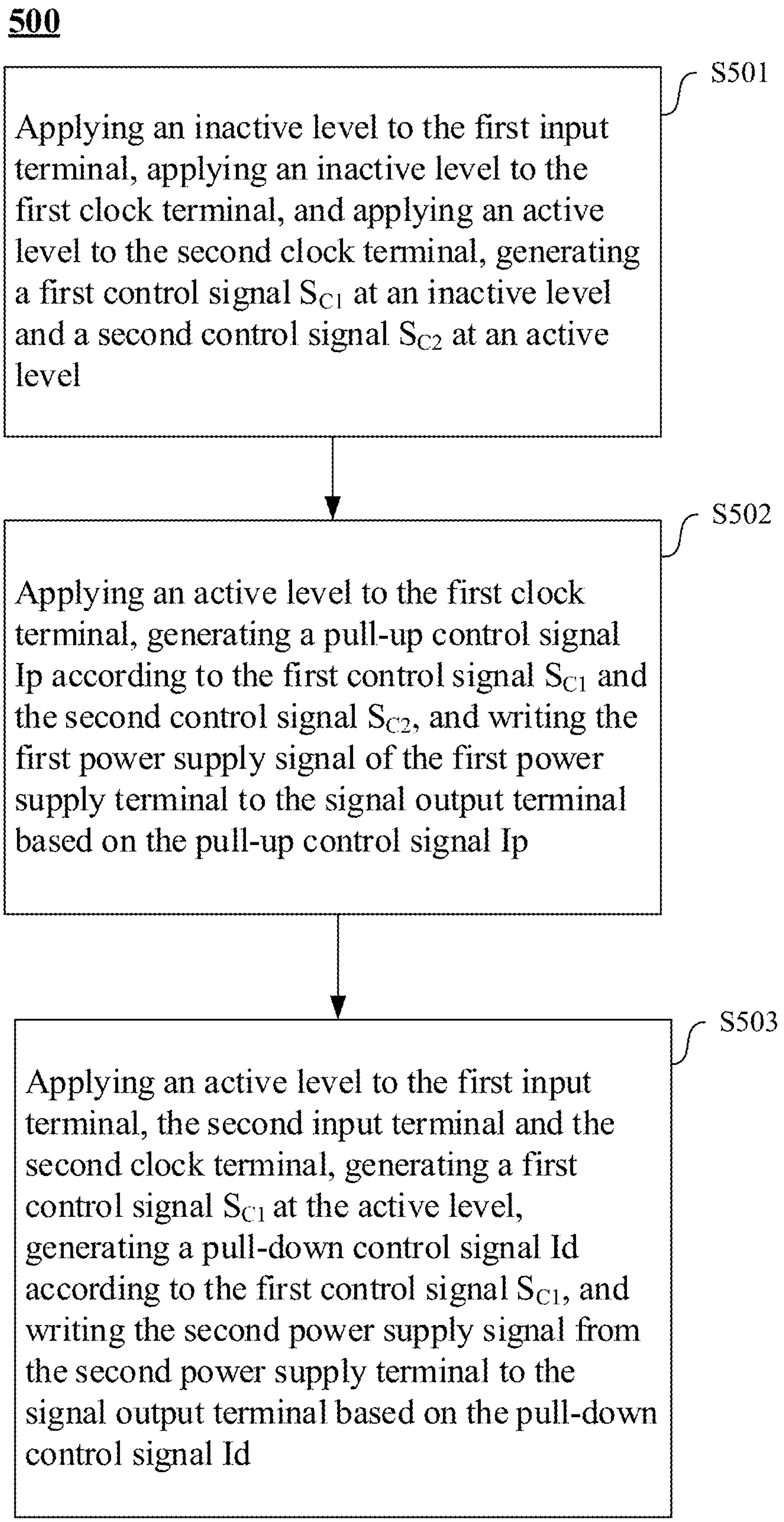
FIG. 5A shows a flowchart of a driving method 500 of a GOA unit according to an embodiment of the present disclosure.

FIG. 5A shows a flowchart of a driving method 500 of a GOA unit according to an embodiment of the present disclosure.

Referring to FIG. 5A, for each GOA unit in the first GOA circuit and the second GOA circuit, first, in step S501, an inactive level is applied to the first input terminal, an inactive level is applied to the first clock terminal, and an active level is applied to the second clock terminal, a first control signal $S_{C1}$ at an inactive level and a second control signal $S_{C2}$ at an active level are generated.

Second, in step S502, an active level is applied to the first clock terminal, a pull-up control signal Ip is generated according to the first control signal $S_{C1}$ and the second control signal $S_{C2}$, and the first power supply signal of the first power supply terminal is written to the signal output terminal based on the pull-up control signal.

Last, in step S503, an active level is applied to the first input terminal, the second input terminal and the second clock terminal, a first control signal $S_{C1}$ at the active level is generated, a pull-down control signal Id is generated according to the first control signal $S_{C1}$, and the second power supply signal is written from the second power supply terminal to the signal output terminal based on the pull-down control signal.

Based on the driving method 500, the first GOA and the second GOA can be driven to generate the reset control signal, the scan control signal, and the light-emitting control signal for the pixel circuit, so as to realize the corresponding functions of the display device.

Figure 5B:
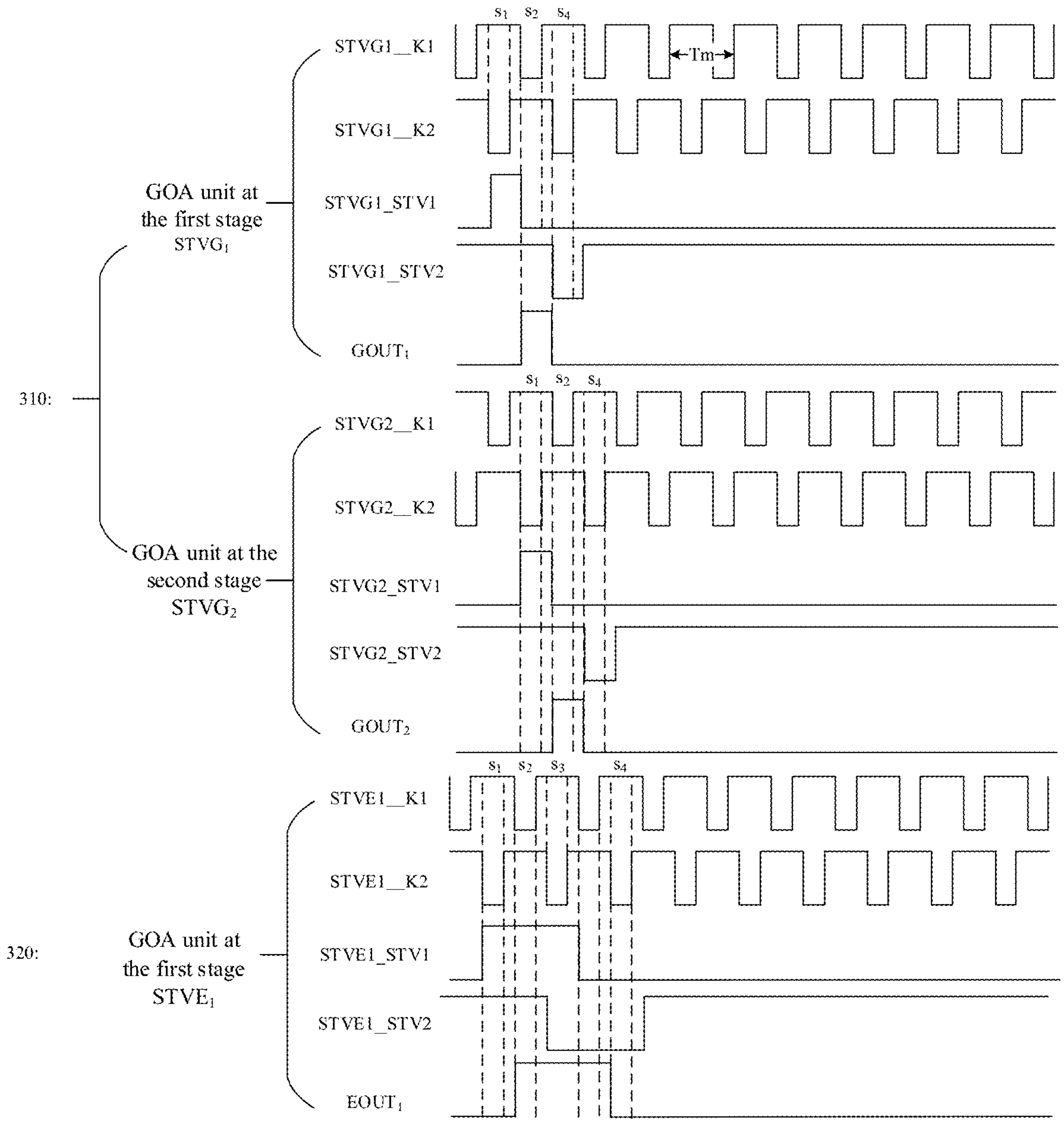
FIG. 5B shows a operation timing diagram of a first-stage GOA unit, a second-stage GOA unit in the first GOA circuit, and a first-stage GOA unit of the second GOA circuit according to an embodiment of the present disclosure.

FIG. 5B shows an operation timing diagram of the GOA unit $STVG_1$ at the first stage, the GOA unit $STVG_2$ at the second stage of the first GOA circuit 310, and the GOA unit $STVE_1$ at the first stage of the second GOA circuit 320 according to an embodiment of the present disclosure Referring to FIG. 5B, taking the first array GOA circuit 310, the second array GOA circuit 320 shown in FIG. 4B, and the pixel circuit in FIG. 1B as an example, the above control method 500 of the display device may be described more specifically.

The first power supply signal is a high level signal VGH, the second power supply signal is a low level signal VGL, the clock cycle CK1 and the clock signal CK2 have the same clock cycle Tm, and the clock signal CK1 lags the clock signal CK2 by a half of the clock cycle Tm. The first input terminal of the GOA unit $STVG_1$ at the first stage of the first GOA circuit 310 is connected to the first initial signal STVG_Original, the first clock signal terminal receives the clock signal CK1, the second clock signal terminal thereof receives the clock signal CK2. The inactive levels of the first initial signal STVG_Original, the clock signal CK1 and the clock signal CK2 all are a high level, and the duration of the inactive level of the first initial signal STVG_Original is half of the clock cycle Tm of the clock signal CK1. The first control signal, the second control signal, the pull-up control signal and the pull-down control signal all use a low level as their active level. The inactive level of the second initial signal STVE_Original is a high level, the start time of the inactive level is the same as that of the first initial signal STVG_Original, and the duration of the inactive level is equal to three times of the duration of the inactive level of the first initial signal, that is, 1.5 times of the clock cycle Tm of the clock signal CK1.

Based on the above, the specific operating timing relationship of the GOA unit $STVG_1$ at the first stage, the GOA unit $STVG_2$ at the second stage of the first GOA circuit 310 and the GOA unit $STVE_1$ at the first stage of the second GOA circuit 320 is as follows.

First, the GOA unit $STVG_1$ at the first stage of the first GOA circuit 310 will be in an operating state, the GOA unit $STVG_2$ at the second stage of the first GOA circuit 310 and the GOA unit $STVE_1$ at the first stage of the second GOA circuit 320 are both in a non-operating state. At this time, only the GOA unit $STVG_1$ at the first stage of the first GOA circuit 310 generates an output signal at an active level, that is, generating the reset control signal Reset to reset the pixel circuit in the first row.

The process in which the GOA unit $STVG_1$ of the first GOA circuit 310 at the first stage is in an operating state to generate the reset control signal can be described more specifically as follows.

Referring to FIG. 5, for the GOA unit $STVG_1$ at the first stage, first, in step S501, the first input signal STVG1_STV1 of the first input terminal thereof is made a high level, the second clock signal STVG1_K2 received by the second clock terminal thereof is a low level, the first clock signal STVG1_K1 received at the first clock terminal thereof is a high level, then the GOA unit $STVG_1$ at the first stage enters the first operating phase $s_1$, the first control signal $S_{C1}$ at a high level and the second control signals $S_{C2}$ at a low level are generated, the pull-up input node $P_3$ is at a high level, the output signal $Gout_1$ at the signal output terminal of the $STVG_1$ is at a low level. Thereafter, in step S502, when the first clock signal STVG1_K1 received by the first clock terminal thereof jumps to a low level, the GOA unit $STVG_1$ at the first stage enters the second operating phase 52, the pull-up control signal Ip is generated based on the first control signal $S_{C1}$ at a high level and the second control signal $S_{C2}$ at a low level, the potential of the pull-up input node $P_3$ is pulled up to a low level and the output signal $Gout_1$ is pulled up to a high level signal VGH at the first power supply terminal. Further, as described in step S503, when the first input signal STVG_STV1, the second input signal STVG_STV2, of the GOA unit $STVG_1$ at the first stage, and the second clock signal STVG1_K2 received by the second clock terminal are all at a low level, at this time, the GOA unit $STVG_1$ at the first stage enters the fourth operating phase $s_4$, a low level first control signal $S_{C1}$ is generated, a pull-down control signal Id is generated based on the first control signal $S_{C1}$, so that its signal output terminal thereof will output a low level signal VGL without threshold loss, and the pull-up input node $P_3$ is always at a low level. After that, when the first input signal STVG1_STV1 received at the first input terminal remains at a low level and the second input signal STVG1_STV2 at the second input terminal remains at a high level, the first stage GOA unit $STVG_1$ enters the fifth operating phase $s_5$, at this time, no matter how the levels of the first clock signal STVG1_K1 and the second clock signal STVG1_K2 change, the output signal $Gout_1$ at the signal output terminal thereof will always remain at a low level.

Based on the above operating process, as shown in FIG. 5B, the output signal $Gout_1$ of the signal output terminal of at the GOA unit $STVG_1$ at the first stage has the same pulse width as the first input signal STVG1_STV1 and its phase lags the first input signal STVG1_STV1 by half of the clock cycle Tm, the output sign al $Gout_1$ is the reset control signal Reset of the pixel circuit in the first row.

Thereafter, the GOA unit $STVG_2$ at the second stage of the first GOA circuit 310 is in an operating state, the GOA unit $STVG_1$ at the first stage of the first GOA circuit 310 and the GOA unit $STVE_1$ at the first stage of the second GOA circuit 320 are both in a non-operating state. At this time, only the GOA unit $STVG_2$ at the second stage of the first GOA circuit 310 generates an output signal at an active level, that is, generating the scan control signal Gate, so as to write the data signal Vdata of the data line and the threshold voltage of the driving transistor to the pixel circuit of the first row.

The process in which the GOA unit $STVG_2$ at the second stage is in an operating state to generate the scan control signal can be described more specifically as follows.

Based on the cascading relationship within the first GOA circuit 310, the GOA unit $STVG_2$ at the second stage will use the output signal $Gout_1$ of the GOA unit $STVG_1$ at the first stage as its first input signal, and because the first clock signal and the second clock signal of the second GOA unit $STVG_2$ at the second stage and the GOA unit $STVG_1$ at the first stage are interchanged, as shown in FIG. 5B, for the GOA unit $STVG_2$ at the second stage, similarly, the GOA unit $STVG_2$ at the second stage will sequentially be in the first operating phase $s_1$, the second operating phase 52, the fourth operating phase $s_4$ and the fifth operating phase $s_5$ as described above, and due to cycle setting of the respective signals shown in FIG. 5B, the output signal $Gout_2$ of the second signal output terminal and the output signal $Gout_1$ of the first stage GOA unit $STVG_1$ have the same pulse width, and the output signal $Gout_2$ lags the output signal $Gout_1$ by a half of the clock cycle Tm.

Finally, the GOA unit $STVE_1$ at the first stage of the second GOA circuit 320 is in an operating state, and both the GOA unit $STVG_1$ at the first stage and the GOA unit $STVG_2$ at the second stage of the first GOA circuit 310 are in a non-operating state. At this time, only the GOA unit $STVE_1$ at the first stage of the second GOA circuit 320 generates an output signal at an active level, that is, generating the light-emitting control signal EM, so as to drive the first row pixel circuit to use the data signal and the threshold voltage of the driving transistor as stored in the pixel circuit to generate a current that drives the light emitting device to emit light.

The process in which the GOA unit STVE1 at the first stage of the second GOA circuit 320 is in an operating state to generate the light-emitting control signal EM can be described more specifically as follows.

Based on the above circuit operating principle, for the GOA unit $STVE_1$ at the first stage in FIG. 4B, first, when the first clock signal STVE1_K1 received by it is at a high level, the second clock signal STVE1_K2 is at a low level, the first input signal STVE1_STV1 received by the first input terminal thereof is at a high level, it enters the first operating phase $s_1$, the output signal $Eout_1$ of the signal output terminal of the GOA unit $STVE_1$ at the first stage is at a low level. Thereafter, when its first clock signal STVE1_K1 is at a low level, the GOA unit $STVE_1$ at the first stage enters the second operating phase 52, its output signal $Eout_1$ will jump to a high level, afterwards, when the first clock signal STVE1_K1 again jumps to a high level, the output signal $Eout_1$ remains at a high level. Further, when the first clock signal STVE1_K1 received by it is at a high level, the second clock signal STVE1_K2 is at a low level, the first input signal STVE1_STV1 received at the first input terminal is at a high level and the second input signal STVE1_STV2 at the second input terminal is at a low level, the GOA unit $STVE_1$ at the first stage enters the third operating phase $s_3$, its output signal $Eout_1$ remains at a high level, thereafter, when its first clock signal STVE1_K1 jumps to a low level and the second clock signal STVE1_K2 jumps to a high level, its output signal $Eout_1$ remains at a high level. Subsequently, when the first clock signal STVE1_K1 received by it is at a high level, the second clock signal STVE1_K2 is at a low level, the first input signal STVE1_STV1 received at the first input terminal and the second input signal STVE1_STV2 at the second input terminal are both at a low level, the GOA unit $STVE_1$ at the first stage enters the fourth operating phase $s_4$, and the output signal $Eout_1$ at its signal output terminal jumps to a low level. After that, when the first input signal STVE1_STV1 received at the first input terminal remains at a low level and the second input signal STVE1_STV2 at the second input terminal remains at a high level, the GOA unit $STVE_1$ at the first stage enters the fifth operating phase $s_5$, the output signal $Eout_1$ at its signal output terminal will always remain at a low level, regardless of how the levels of the first clock signal STVE1_K1 and the second clock signal STVE1_K2.

Based on the above operating process, the output signal $Eout_1$ at the $STVE_1$ signal output terminal of the GOA unit at the first stage will finally show a waveform as shown in FIG. 5B, the pulse width of the output signal $Eout_1$ is the same as that of the input signal STVE1_STV1, the output signal $Eout_1$ lags the input signal STVE1_STV1 by a half of the clock cycle Tm, that is, it has the same start time as the output signal $Gout_1$ of the GOA unit $STVG_1$ at the first stage of the first GOA circuit 310, and its pulse width is three times of the pulse width of $Gout_1$.

Based on the above timing relationship and work flow, the GOA unit $STVG_1$ at the first stage, the GOA unit $STVG_2$ at the second stage e of the first GOA circuit 310, and the GOA unit $STVE_1$ at the first stage of the second GOA circuit 320 will be in operating order in turn, so that the reset control signal Reset, the scan control signal Gate and the light-emitting control signal EM having an active level are generated in order to achieves effective control of the pixel circuit in the first row.

Based on the foregoing, in the display device shown in FIG. 5B, for the two adjacent GOA units in the first GOA circuit 310, the output signal of the signal output terminal of the GOA unit at a previous stage can be used as the reset signal of the corresponding pixel circuit, wherein the output signal of the signal output terminal of the GOA unit in a next stage is used as the Gate signal of the same pixel circuit.

Similarly, based on the cascading relationship inside the second GOA circuit 320, for the GOA unit at each stage in the second GOA circuit 320, the output signal of the signal output terminal thereof is used as the EM signal of the corresponding pixel circuit at the same stage, to realize the aforementioned operating process by coordinating with the first GOA unit at the same stage.

Certain terminology has been used to describe embodiments of the present disclosure. For example, the terms "first/second embodiment", "one embodiment", "an embodiment", and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by a person skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "data block", "module", "engine", "unit," "module," or "system". Furthermore, aspects of the present disclosure may take the form of a computer program product embodied in one or more computer-readable media having computer-readable program code embodied thereon.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having the meaning that is consistent with their meaning in the context of the relevant art and will not be interpreted in an idealized or overly formal sense unless expressly so defined herein.

The above is illustration of the present disclosure and should not be construed as making limitation thereto. Although some exemplary embodiments of the present disclosure have been described, a person skilled in the art can easily understand that many modifications may be made to these exemplary embodiments without departing from the creative teaching and advantages of the present disclosure. Therefore, all such modifications are intended to be included within the scope of the present disclosure as defined by the appended claims. As will be appreciated, the above is to explain the present disclosure, it should not be constructed as limited to the specific embodiments disclosed, and modifications to the present disclosure and other embodiments are included in the scope of the attached claims. The present disclosure is defined by the claims and their equivalents.

What is claimed is:

1. A display device, comprising a pixel circuit array, a first GOA circuit and a second GOA circuit, the pixel circuit array comprising a plurality of pixel circuits, wherein the first GOA circuit and the second GOA circuit are connected to a plurality of control signal terminals in a same row of pixel circuits, and a control signal terminal electrically connected to the first GOA circuit in the plurality of control signal terminals is different from a control signal terminal electrically connected to the second GOA circuit in the plurality of control signal terminals;

the first GOA circuit and the second GOA circuit are both connected to a same first clock signal line and a same second clock signal line, the first clock signal line is configured to provide a first clock signal, and the second clock signal line is configured to provide a second clock signal;

wherein each pixel circuit of the plurality of pixel circuits comprises a light-emitting control subcircuit and a voltage writing subcircuit, the light-emitting control subcircuit comprises a driving transistor, the voltage writing subcircuit comprises a first compensation transistor, a gate of the first compensation transistor is connected to a scan control signal line, a first terminal of the first compensation transistor is connected to a gate of the driving transistor, and a second terminal of the first compensation transistor is connected to a second terminal of the driving transistor;

a first terminal of the driving transistor is connected to a power supply voltage terminal;

the first GOA circuit is located at a side of the first clock signal line and the second clock signal line, and the second GOA circuit is located at the other side of the first clock signal line and the second clock signal line;

the first GOA circuit, the second GOA circuit, the first clock signal line, and the second clock signal line all are located on a same side of the pixel circuit array;

wherein each of the first GOA circuit and the second GOA circuit comprises a plurality of cascaded GOA subcircuits, first power supply terminals of all the GOA subcircuits receive a first power supply signal, second power supply terminals of all the GOA subcircuits receive a second power supply signal;

each of the plurality of cascaded GOA subcircuits comprises an input subcircuit, a pull-up control subcircuit, a pull-up subcircuit, a pull-down control subcircuit, a pull-down subcircuit, wherein the input subcircuit is connected to the second power supply terminal, a second clock terminal and a first input terminal, and is configured to generate and output a first control signal according to a first input signal of the first input terminal and generate and output a second control signal according to the second power supply signal at the second power supply terminal when the second clock signal of the second clock terminal is at an active level;

the pull-up control subcircuit is connected to the input subcircuit, the first power supply terminal and a first clock terminal, has a first control input node and a second control input node, and is configured to write the first control signal and the second control signal as received from the input subcircuit into the first control input node and the second control input node respectively, and generate and output a pull-up control signal when the first control input node is at an inactive level and the second control input node and the first clock signal at the first clock terminal both are at an active level;

the pull-up subcircuit is connected to the pull-up control subcircuit, the first power supply terminal and a signal output terminal, and has a pull-up input node, the pull-up subcircuit is configured to cause the pull-up input node to be at an active level to write the first power supply signal of the first power supply terminal to the signal output terminal under control of the pull-up control signal;

the pull-down control subcircuit is connected to the input subcircuit and the first clock terminal, and is connected to a pull-down control input node, the pull-down control subcircuit is configured to cause the pull-down control input node to be at an active level and output a pull-down control signal under control of the first control signal;

the pull-down subcircuit is connected to the pull-down control subcircuit, the second power supply terminal, and the signal output terminal, and has a pull-down input node, the pull-down subcircuit is configured to cause the pull-down input node to be at an active level to write the second power supply signal of the second power supply terminal to the signal output terminal under control of the pull-down control signal.

2. The display device according to claim 1, wherein the first GOA circuit and the second GOA circuit comprise the same GOA circuit, and the first GOA circuit and the second GOA circuit both receive the first power supply signal, the second power supply signal, and a clock signal.

3. The display device according to claim 2, wherein the signal output terminal of the GOA subcircuit at each stage is connected to the first input terminal of the GOA subcircuit at an adjacent next stage;

the first clock signal at the first clock terminal of the GOA subcircuit at each stage is the same as the second clock signal at the second clock terminal of the GOA subcircuit at an adjacent next stage; the second clock signal at the second clock terminal of the GOA subcircuit at each stage is the same as the first clock signal at the first clock terminal of the GOA subcircuit at an adjacent next stage.

4. The display device according to claim 3, wherein the first input terminal of the GOA subcircuit at a first stage of the first GOA circuit is configured to receive a first initial signal, the first input terminal of the GOA subcircuit at a first stage of the second GOA circuit is configured to receive a second initial signal, and wherein a start time of an inactive level of the first initial signal is same as a start time of an inactive level of the second initial signal, and a duration of the inactive level of the second initial signal is three times a duration of the inactive level of the first initial signal.

5. The display device according to claim 3, wherein the signal output terminal of each GOA subcircuit of the first GOA circuit is located at a side of the first GOA circuit away from the first clock signal line and the second clock signal line;

the signal output terminal of each GOA subcircuit of the first GOA circuit is located at a side of the second GOA circuit away from the first clock signal line and the second clock signal line.

6. The display device according to claim 1, wherein the pull-down subcircuit comprises:

a pull-down transistor, a gate thereof being connected to the pull-down input node, a first terminal thereof being connected to the signal output terminal, and a second terminal thereof being connected to the second power supply terminal.

7. The display device according to claim 1, wherein the input subcircuit comprises:

a first transistor, a gate thereof being connected to the second clock terminal, a first terminal thereof being connected to the first control input node, and a second terminal thereof being connected to the first input terminal;

a second transistor, a gate thereof being connected to the first control input node, a first terminal thereof being connected to the second control input node, and a second terminal thereof being connected to the second clock terminal;

a third transistor, a gate thereof being connected to the second clock terminal, a first terminal thereof being connected to the second control input node, and a second terminal thereof being connected to the second power supply terminal.

8. The display device according to claim 1, wherein the pull-up control subcircuit comprises:

a fourth transistor, a gate thereof being connected to the second control input node, a first terminal thereof being connected to a second terminal of a fifth transistor, and a second terminal thereof being connected to the first clock terminal;

a fifth transistor, a gate thereof being connected to the first clock terminal, and a first terminal thereof being connected to the pull-up input node;

a sixth transistor, a gate thereof being connected to the first control input node, a first terminal thereof being connected to the first power supply terminal, and a second terminal thereof being connected to the pull-up input node;

a third capacitor, a first terminal thereof being connected to the first terminal of the fourth transistor, and a second terminal thereof being connected to the second control input node.

9. The display device according to claim 1, wherein the pull-up subcircuit comprises:

a first capacitor, a first terminal thereof being connected to the first power supply terminal, and a second terminal thereof being connected to the pull-up input node;

an eighth transistor, a gate thereof being connected to the pull-up input node, a first terminal thereof being connected to the first power supply terminal, and a second terminal thereof being connected to the signal output terminal.

10. Display device according to claim 1, wherein the pull-down control subcircuit comprises:

a seventh transistor, a gate thereof being connected to the pull-down control input node, and a second terminal thereof being connected to the first clock terminal;

a second capacitor, a first terminal thereof being connected to the pull-down control input node, and a second terminal thereof being connected to a first terminal of the seventh transistor.

11. The display device according to claim 1, wherein each pixel circuit of the plurality of pixel circuits receives a reset control signal, a scan control signal and a light-emitting control signal, the pixel circuit further comprises a reset subcircuit, wherein the plurality of control signal terminals comprises a reset control signal terminal, a scan control signal terminal and a light-emitting control signal terminal, the scan control signal terminal is a terminal on the scan control signal line, the reset subcircuit is connected to the reset control signal terminal, and is configured to receive the reset control signal from the reset control signal terminal, and reset the pixel circuit under control of the reset control signal;

the voltage writing subcircuit is connected to a data line and the scan control signal line, and is configured to receive the scan control signal from the scan control signal line, and store a data signal of the data line and a threshold voltage of the driving transistor under control of the scan control signal;

the light-emitting control subcircuit is connected to the light-emitting control signal terminal and comprises the driving transistor, and is configured to receive the light-emitting control signal from the light-emitting control signal terminal, and use the data signal and the threshold voltage of the driving transistor as stored in the pixel circuit to generate a current which drives a light-emitting means to emit light under control of the light-emitting control signal;

wherein the light-emitting control subcircuit comprises a first type transistor, the reset subcircuit and the voltage writing subcircuit comprise a second type transistor different from the first type transistor.

12. The display device according to claim 11, wherein the reset subcircuit comprises:

a first reset transistor, a gate thereof being connected to the reset control signal terminal, a first terminal thereof being connected to a first reference voltage terminal, and a second terminal thereof being connected to a second node;

a second reset transistor, a gate thereof being connected to the reset control signal terminal, a first terminal thereof being connected to a first node, and a second terminal thereof being connected to a second reference voltage terminal;

a third reset transistor, a gate thereof being connected to the reset control signal terminal, and a second terminal thereof being connected to at least one light-emitting means;

wherein the reset subcircuit is configured to reset the first node and the second node under control of the reset control signal.

13. The display device according to claim 12, wherein the gate of the driving transistor and the first terminal of the first compensation transistor are connected to the first node, the voltage writing subcircuit further comprises:

an input transistor, a gate thereof being connected to the scan control signal line, a first terminal thereof being connected to the second node, and a second terminal thereof being connected to the data line;

a compensation capacitor, a second terminal thereof being connected to the first node;

wherein the voltage writing subcircuit is configured to write the data signal of the data line to the second node under control of the scan control signal, and store the data signal and the threshold voltage of the driving transistor between the first node and the second node.

14. The display device according to claim 12, wherein the light-emitting control subcircuit further comprises:

a first light-emitting transistor, a gate thereof being connected to the light-emitting control signal terminal, and a second terminal thereof being connected to the second node;

a light-emitting control transistor, a gate thereof being connected to the light-emitting control signal terminal, a first terminal thereof being connected to the second terminal of the driving transistor, and a second terminal thereof being connected to the at least one light-emitting means;

wherein the light-emitting control subcircuit is configured to use the data signal and the threshold voltage of the driving transistor as stored between the first node and the second node to generate the current that drives the light-emitting means to emit light under control of the light-emitting control signal.

15. The display device according to claim 14, wherein the second reset transistor and the first compensation transistor all are N-type oxide thin film transistors, the driving transistor, the first light-emitting transistor and the light-emitting control transistor all are P-type low-temperature polysilicon thin film transistors.

16. The display device according to claim 12, wherein the first reference voltage terminal is a reference potential terminal or the power supply voltage terminal or a data line.

17. The display device according to claim 11, wherein the reset control signal and the scan control signal have different start time and the same duration.

18. A method for driving the pixel circuit according to claim 11, wherein the method comprises:

applying an active level to the reset control signal terminal, resetting the pixel circuit;

applying an active level to the scan control signal line, storing the data signal and the threshold voltage of the driving transistor in the pixel circuit; and applying an active level to the light-emitting control signal terminal, and using the data signal and the threshold voltage of the driving transistor as stored in the pixel circuit to drive the light-emitting means to emit light.

19. A method for driving the display device according to claim 1, wherein for each GOA subcircuit:

applying an inactive level to the first input terminal, applying an inactive level to the first clock terminal, and applying an active level to the second clock terminal, generating a first control signal at an inactive level and a second control signal at an active level;

applying an active level to the first clock terminal, generating a pull-up control signal according to the first control signal and the second control signal, and writing the first power supply signal of the first power supply terminal to the signal output terminal based on the pull-up control signal;

applying an active level to the first input terminal, the second input terminal and the second clock terminal, generating a first control signal at the active level, generating a pull-down control signal according to the first control signal, and writing the second power supply signal from the second power supply terminal to the signal output terminal based on the pull-down control signal.

20. A display device, comprising a pixel circuit array, a first GOA circuit and a second GOA circuit, the pixel circuit array comprising a plurality of pixel circuits, wherein the first GOA circuit and the second GOA circuit are connected to a plurality of control signal terminals in a same row of pixel circuits, and a control signal terminal electrically connected to the first GOA circuit in the plurality of control signal terminals is different from a control signal terminal electrically connected to the second GOA circuit in the plurality of control signal terminals;

the first GOA circuit and the second GOA circuit are both connected to a same first clock signal line and a same second clock signal line, the first clock signal line is configured to provide a first clock signal, and the second clock signal line is configured to provide a second clock signal;

wherein each pixel circuit of the plurality of pixel circuits comprises a light-emitting control subcircuit and a voltage writing subcircuit, the light-emitting control subcircuit comprises a driving transistor, the voltage writing subcircuit comprises a first compensation transistor, a gate of the first compensation transistor is connected to a scan control signal line, a first terminal of the first compensation transistor is connected to a gate of the driving transistor, and a second terminal of the first compensation transistor is connected to a second terminal of the driving transistor;

a first terminal of the driving transistor is connected to a power supply voltage terminal;

the first GOA circuit is located at a side of the first clock signal line and the second clock signal line, and the second GOA circuit is located at the other side of the first clock signal line and the second clock signal line;

the first GOA circuit, the second GOA circuit, the first clock signal line, and the second clock signal line all are located on a same side of the pixel circuit array;

wherein the first GOA circuit and the second GOA circuit comprise the same GOA circuit, and the first GOA circuit and the second GOA circuit both receive a first power supply signal, a second power supply signal, and a clock signal;

each of the first GOA circuit and the second GOA circuit comprises a plurality of cascaded GOA subcircuits, first power supply terminals of all the GOA subcircuits receive the first power supply signal, second power supply terminals of all the GOA subcircuits receive the second power supply signal;

a signal output terminal of the GOA subcircuit at each stage is connected to a first input terminal of the GOA subcircuit at an adjacent next stage;

the first clock signal at a first clock terminal of the GOA subcircuit at each stage is the same as the second clock signal at a second clock terminal of the GOA subcircuit at an adjacent next stage; the second clock signal at the second clock terminal of the GOA subcircuit at each stage is the same as the first clock signal at the first clock terminal of the GOA subcircuit at an adjacent next stage, the first input terminal of the GOA subcircuit at a first stage of the first GOA circuit is configured to receive a first initial signal, the first input terminal of the GOA subcircuit at a first stage of the second GOA circuit is configured to receive a second initial signal, and a start time of an inactive level of the first initial signal is same as a start time of an inactive level of the second initial signal, and a duration of the inactive level of the second initial signal is three times a duration of the inactive level of the first initial signal.

* * * * *